(12) United States Patent
Fu et al.

(10) Patent No.: US 12,015,780 B2
(45) Date of Patent: Jun. 18, 2024

(54) INTER PREDICTION METHOD AND APPARATUS, VIDEO ENCODER, AND VIDEO DECODER

(71) Applicant: Huawei Technologies Co., Ltd., Shenzhen (CN)

(72) Inventors: Ting Fu, Shenzhen (CN); Huanbang Chen, Shenzhen (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/187,423

(22) Filed: Feb. 26, 2021

(65) Prior Publication Data

US 2021/0185323 A1 Jun. 17, 2021

Related U.S. Application Data

(63) Continuation of application No. PCT/CN2019/091005, filed on Jun. 13, 2019.

(30) Foreign Application Priority Data

Aug. 28, 2018 (CN) .......................... 201810990444.2

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS 9,438,910 B1 9/2016 Han et al.
10,893,289 B2 * 1/2021 Lee .................... H04N 19/513
(Continued)

FOREIGN PATENT DOCUMENTS

AU 2016231582 A1 10/2016
CN 103200401 A 7/2013
(Continued)

OTHER PUBLICATIONS

Yang et al., "Description of CE4: Inter prediction and motion vector coding," Joint Video Experts Team (JVET) of ITU-T SG 16 WP 3 and ISO/IEC JTC 1/SC 29/WG 11, 10th Meeting: San Diego, JVET-J1024r2, US, total 46 pages (Apr. 10-20, 2018).

(Continued)

*Primary Examiner* — Lindsay J Uhl
(74) *Attorney, Agent, or Firm* — Leydig, Voit & Mayer, Ltd.

(57) ABSTRACT

This application provides an inter prediction method and apparatus, a video encoder, and a video decoder. The method includes: determining N target picture blocks from M picture blocks in which M neighboring locations of a current picture block are respectively located, where any two of the N target picture blocks are different, M and N are both positive integers, and M is greater than or equal to N; determining candidate motion information of the current picture block based on motion information of the N target picture blocks, and adding the candidate motion information of the current picture block to a motion information candidate list of the current picture block; and performing inter prediction on the current picture block based on the motion information candidate list. In this application, comparison operations during obtaining of the motion information candidate list can be reduced, to improve inter prediction efficiency.

20 Claims, 17 Drawing Sheets

(51) Int. Cl.
*H04N 19/159* (2014.01)
*H04N 19/176* (2014.01)

(56) References Cited

U.S. PATENT DOCUMENTS

| | | |
|---|---|---|
| 2013/0156335 A1 | 6/2013 | Lim et al. |
| 2013/0301724 A1 | 11/2013 | Boon et al. |
| 2014/0301471 A1 | 10/2014 | Lin |
| 2015/0131726 A1 | 5/2015 | Kim et al. |
| 2016/0219278 A1 | 7/2016 | Chen et al. |
| 2017/0094293 A1 | 3/2017 | Chou et al. |
| 2017/0099495 A1 | 4/2017 | Rapaka et al. |
| 2018/0098063 A1* | 4/2018 | Chen ............... H04N 19/105 |
| 2019/0028731 A1 | 1/2019 | Chuang et al. |
| 2019/0222834 A1* | 7/2019 | Chen ............... H04N 19/54 |
| 2020/0036997 A1* | 1/2020 | Li ............... H04N 19/139 |
| 2020/0244989 A1* | 7/2020 | Lee ............... H04N 19/51 |

FOREIGN PATENT DOCUMENTS

| | | |
|---|---|---|
| CN | 103339938 A | 10/2013 |
| CN | 104079944 A | 10/2014 |
| CN | 104243982 A | 12/2014 |
| CN | 105324996 A | 2/2016 |
| CN | 106559669 A | 4/2017 |
| CN | 107295345 A | 10/2017 |
| CN | 107404651 A | 11/2017 |
| CN | 107529063 A | 12/2017 |
| CN | 108028931 A | 5/2018 |
| CN | 108111846 A | 6/2018 |
| CN | 108271023 A | 7/2018 |
| CN | 108293131 A | 7/2018 |
| CN | 108353184 A | 7/2018 |
| CN | 108432250 A | 8/2018 |
| CN | 109729352 A | 5/2019 |
| CN | 110024384 A | 7/2019 |
| EP | 2568706 A2 | 3/2013 |
| EP | 2728882 A1 | 5/2014 |
| JP | 2013042235 A | 2/2013 |
| JP | 2013138386 A | 7/2013 |
| JP | 2014514811 A | 6/2014 |
| JP | 2017143538 A | 8/2017 |
| JP | 2021-510682 | 6/2022 |
| KR | 20160071477 A | 6/2016 |
| KR | 20180028513 A | 3/2018 |
| TW | 200935918 A | 8/2009 |
| WO | 2017003063 A1 | 1/2017 |
| WO | 2017048008 A1 | 3/2017 |
| WO | 2017171107 A1 | 10/2017 |
| WO | 2017200771 A1 | 11/2017 |
| WO | 2018028559 A1 | 2/2018 |
| WO | 2018058526 A1 | 4/2018 |

OTHER PUBLICATIONS

Yang et al., "Draft text for affine motion compensation," Joint Video Experts Team (JVET) of ITU-T SG 16 WP 3 and ISO/IEC JTC 1/SC 29/WG 11, 11th Meeting: Ljubljana, SI, JVET-K0565-v2, total 61 pages (Jul. 10-18, 2018).

"Series H: Audiovisual and Multimedia Systems, Infrastructure of audiovisual services—Coding of moving video, Video coding for low bit rate communication," ITU-T H.263, total 226 pages, ITU-T Telecommunication Standardization Sector of ITU, Geneva, Switzerland (Jan. 2005).

"Series H: Audiovisual and Multimedia Systems, Infrastructure of audiovisual services—Coding of moving video, Advanced video coding for generic audiovisual services," ITU-T H.264, total 812 pages, ITU-T Telecommunication Standardization Sector of ITU, Geneva, Switzerland (Apr. 2017).

"Series H: Audiovisual and Multimedia Systems, Infrastructure of audiovisual services—Coding of moving video, High efficiency video coding," ITU-T H.265, total 634 pages, ITU-T Telecommunication Standardization Sector of ITU, Geneva, Switzerland (Apr. 2015).

Hsiao et al., "CE4.2-related: MV buffer reduction for non-adjacent spatial merge candidates," Joint Video Experts Team (JVET) of ITU-T SG 16 WP 3 and ISO/IEC JTC 1/SC 29/WG 11, 11th Meeting: Ljubljana, SI, JVET-K0246-v2, pp. 1-7 (Jul. 10-18, 2018).

Robert et al., "CE4.1.4 Affine mode enhancement from J0022," Joint Video Experts Team (JVET) of ITU-T SG 16 WP 3 and ISO/IEC JTC 1/SC 29/WG 11, 11th Meeting: Ljubljana, SI, Document: JVET-K0218-v2, pp. 1-7, International Union of Telecommunication, Geneva, Switzerland (Jul. 10-18, 2018).

Zhong Guo-yun et al., "A Fast HEVC Inter-mode Decision Algorithm Based on Temporal and Spatial Correlation," Journal of East China Institute of Technology, vol. 36, No. 4, pp. 424-431 (Dec. 2013). With an English Abstract.

* cited by examiner

INTER PREDICTION METHOD AND APPARATUS, VIDEO ENCODER, AND VIDEO DECODER

CROSS-REFERENCE TO RELATED APPLICATIONS

This application is a continuation of International Application No. PCT/CN2019/091005, filed on Jun. 13, 2019, which claims priority to Chinese Patent Application No. 201810990444.2, filed on Aug. 28, 2018. The disclosures of the aforementioned applications are hereby incorporated by reference in their entireties.

TECHNICAL FIELD

This application relates to the field of video encoding and decoding technologies, and more specifically, to an inter prediction method and apparatus, a video encoder, and a video decoder.

BACKGROUND

A digital video capability can be incorporated into a wide variety of apparatuses, including a digital television, a digital live broadcast system, a wireless broadcast system, a personal digital assistant (PDA), a laptop or desktop computer, a tablet computer, an e-book reader, a digital camera, a digital recording apparatus, a digital media player, a video game apparatus, a video game console, a cellular or satellite radio phone (namely, "smartphone"), a video conferencing apparatus, a video streaming apparatus, and the like. A digital video apparatus implements video compression technologies, such as video compression technologies described in standards defined in MPEG-2, MPEG-4, ITU-T H.263, and ITU-T H.264/MPEG-4 part 10 advanced video coding, a video coding standard H.265/high efficiency video coding (HEVC) standard, and extensions of such standards. The video apparatus can more efficiently transmit, receive, encode, decode, and/or store digital video information by implementing such video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of the picture, spatial prediction based on a reference sample in a neighboring block in the same picture or temporal prediction based on a reference sample in another reference picture may be used. The picture may be referred to as a frame, and the reference picture may be referred to as a reference frame.

In HEVC, two inter prediction modes are usually used: advanced motion vector prediction (AMVP) mode and merge mode.

In both of the AMVP mode and the merge mode, a motion information candidate list needs to be maintained. Before new motion information is added to the motion information candidate list each time, it needs to be determined whether motion information that is the same as the current to-be-added motion information already exists in the motion information candidate list. If the same motion information already exists in the motion information candidate list, the current to-be-added motion information is discarded. If no same motion information exists in the motion information candidate list, the current to-be-added motion information is added to the motion information candidate list.

In the foregoing process of updating the motion information candidate list, whether two pieces of motion information are the same needs to be determined. In a conventional solution, whether the two pieces of motion information are the same is usually determined by determining whether parameters such as prediction directions, reference frames, and horizontal and vertical components of motion vectors of the two pieces of motion information are the same. A plurality of comparison operations are required, and complexity is relatively high.

SUMMARY

This application provides an inter prediction method and apparatus, a video encoder, and a video decoder, to reduce a quantity of comparison operations during obtaining of a motion information candidate list, to improve inter prediction efficiency.

According to a first aspect, an inter prediction method is provided. The method includes: determining N target picture blocks from M picture blocks in which M neighboring locations of a current picture block are located; determining candidate motion information of the current picture block based on motion information of the N target picture blocks, and adding the candidate motion information of the current picture block to a motion information candidate list of the current picture block; and performing inter prediction on the current picture block based on the motion information candidate list.

Any two of the N target picture blocks are different (in other words, no same picture block exists in the N target picture blocks). M and N are both positive integers, and M is greater than or equal to N. In addition, that any two of the N target picture blocks are different may mean that each of the N target picture blocks is different from other (N−1) target picture blocks.

It should be understood that each of the M neighboring locations is located in one picture block, and the M neighboring locations are respectively located in the M picture blocks. It should be understood that some of the M picture blocks may be the same. In other words, different neighboring locations may be all in a same picture block. N picture blocks are determined from the M picture blocks, so that repeated picture blocks in the M picture blocks can be screened out (when some of the M picture blocks are the same). In this way, the N target picture blocks that are different from each other are determined.

In addition, determining candidate motion information of the current picture block based on motion information of the N target picture blocks may specifically be: determining the candidate motion information of the current picture block based on motion information of each of the N target picture blocks.

It should be understood that the neighboring location of the current picture block may be a location adjacent to a boundary of the current picture block. Further, the neighboring location of the current picture block may be a location (for example, a location from which a distance to the boundary of the current picture block is within a specific range) that is extended to have a specific distance to the boundary of the current picture block. Further, the neighboring location may alternatively be a 4×4 subblock around the boundary of the current picture block. In an example, the neighboring locations may be locations of blocks, such as A1, B1, B0, A0, and B2, in which peripheral neighboring locations of the current picture block are located. For example, the neighboring locations may be locations of center points or top-left corners of the blocks A1, B1, B0, A0, and B2 in which the peripheral neighboring locations are located.

Optionally, the performing inter prediction on the current picture block based on the motion information candidate list includes: determining target motion information from the motion information candidate list; and performing inter prediction on the current picture block based on the target motion information. If the method is used to encode a picture block, the determining target motion information from the motion information candidate list may be: determining the target motion information (also referred to as target candidate motion information) from the motion information candidate list according to a rate-distortion cost criterion. For example, a rate-distortion cost for encoding the current picture block by using the target candidate motion information is minimum.

If the method is used to decode a picture block, the determining target motion information from the motion information candidate list may be: determining the target motion information (also referred to as the target candidate motion information) from the motion information candidate list based on first identifier information (for example, an index) obtained by parsing a bitstream. The target candidate motion information is used to predict motion information of the current picture block. Optionally, when a length of the motion information candidate list is 1, no index is required to indicate the target motion information, and the unique candidate motion information is determined as the target candidate motion information.

The motion information of the current coding picture block is predicted/obtained based on the target candidate motion information. For example, the target candidate motion information is determined as the motion information of the current picture block. Alternatively, if the target candidate motion information is a motion vector predictor, the motion information of the current picture block is determined based on the motion vector predictor and a motion vector difference (MVD) that is of the current picture block and that is obtained by parsing the bitstream. Inter prediction is performed on the current picture block based on the motion information of the current picture block, to obtain a prediction block (namely, a predicted pixel value) of the current picture block.

The target motion information may be optimal motion information determined from the motion information candidate list.

Specifically, if the current picture block is a non-affine coding block, the performing inter prediction on the current picture block based on the target motion information may include: performing motion compensation on the current picture block based on the target motion information, to obtain a predictor of the current picture block.

If the current picture block is an affine coding block, the target motion information (motion information of a control point of the current picture block) needs to be determined from the motion information candidate list. Then, motion information of each subblock of the current picture block is determined based on the target motion information. Then, motion compensation (motion compensation) is performed on each subblock based on the motion information of each subblock, to obtain a predictor of each subblock. It should be understood that the predictor of the current picture block is obtained after the predictor of each subblock is obtained.

Optionally, M and N are preset values.

For example, a value of N is 5.

It should be understood that the inter prediction method in the first aspect may be an inter prediction method in a translational model, or an inter prediction method in a non-translational model (for example, an affine motion model).

Optionally, the current picture block is a current coding block (for example, an affine coding block) or a current decoding block (for example, an affine decoding block). It should be understood that a picture block in this application specifically refers to a coding unit (coding unit) in a coding process, and specifically refers to a decoding unit (decoding unit) in a decoding process.

It should be understood that the picture block in which the neighboring location of the current picture block is located may be referred to as a neighboring picture block of the current picture block, and the neighboring picture block of the current picture block may be a spatially neighboring picture block or a temporally neighboring picture block of the current picture block.

In other words, the M neighboring locations may all be spatially neighboring locations or temporally neighboring locations, or the M neighboring locations may include both the spatially neighboring location and the temporally neighboring location.

Correspondingly, the M picture blocks may all be spatially neighboring picture blocks of the current picture block or temporally neighboring picture blocks of the current picture block. Alternatively, the M picture blocks include both the spatially neighboring picture block of the current picture block and the temporally neighboring picture block of the current picture block.

In this application, at least one different target picture block is determined from a plurality of picture blocks in which the neighboring locations of the current picture block are located, so that the candidate motion information of the current picture block can be determined based on the at least one target picture block. In addition, the obtained candidate motion information is added to the motion information candidate list of the current picture block without comparing whether the candidate motion information is the same. This can reduce, to an extent, comparison operations performed when the motion information candidate list is obtained during inter prediction, thereby improving inter prediction efficiency and encoding and decoding performance.

In some implementations of the first aspect, the determining N target picture blocks from M picture blocks in which M neighboring locations of a current picture block are located includes: determining a picture block in which a current neighboring location of the current picture block is located; and when the picture block in which the current neighboring location is located is different from each of obtained target picture blocks, determining the picture block in which the current neighboring location is located as a target picture block of the current picture block.

It should be understood that the current neighboring location may be any one of the M neighboring locations, and the picture block in which the current neighboring location is located may be any one of the M picture blocks. The obtained target picture blocks may be some of the N target picture blocks.

In some implementations of the first aspect, the picture block in the current neighboring location is located is on a first side of the current picture block, and the method further includes: when at least one first target picture block on the first side of the current picture block exists in the obtained target picture blocks, determining whether the picture block in which the current neighboring location is located is the same as each of the at least one first target picture block; and when the picture block in which the current neighboring location is located is different from each of the at least one first target picture block, determining that the picture block in which the current neighboring location is located is different from each of the obtained target picture blocks.

Optionally, the first side includes a left side and an above side.

Further, the first side may include a right side and a below side.

It should be understood that if two neighboring picture blocks are separately on different sides of the current picture block (for example, one picture block is on the above side of the current picture block, and the other picture block is on the left side of the current picture block), the two neighboring picture blocks cannot be the same. In this case, the two neighboring picture blocks may be directly determined as different picture blocks. Therefore, if the obtained target picture blocks and the picture block in which the current neighboring location is located are on different sides, the picture block in which the current neighboring location is located may be directly determined as the target picture block.

However, if some of the obtained target picture blocks are on a same side as the picture block in which the current neighboring location is located, the picture block in which the current neighboring location is located only needs to be compared with the target picture blocks that are of the obtained target picture blocks and that are on the same side as the picture block in which the current neighboring location is located. If the picture block in which the current neighboring location is located is different from all the picture blocks that are of the obtained target picture blocks and that are on the same side, the picture block in which the current neighboring location is located may be determined as the target picture block.

In this application, when a picture block that is on the same side as the picture block in which the current neighboring location is located exists in the obtained target picture blocks, the picture block in which the current neighboring location is located only needs to be compared with the picture block that is of the obtained target picture blocks and that is on the same side. This can further reduce a quantity of comparisons in a process of constructing the motion information candidate list.

Optionally, the method further includes: determining whether the at least one first target picture block on the first side of the current picture block exists in the obtained target picture blocks.

Specifically, whether the obtained target picture blocks are on the first side of the current picture block may be determined based on coordinates of the obtained target picture blocks and coordinates of the current picture block.

Optionally, the determining whether the at least one first target picture block on the first side of the current picture block exists in the obtained target picture blocks includes: determining, based on pixel coordinates of preset locations of the obtained target picture blocks and pixel coordinates of a preset location of the current picture block, whether the obtained target picture blocks are on the first side of the current picture block.

The preset location may be a top-left corner (or a top-right corner or another specific location) of the picture block.

For example, pixel coordinates of a top-left corner of the current picture block are (x0, y0). The obtained target picture blocks include a target picture block 1 and a target picture block 2. Pixel coordinates of a top-left corner of the target picture block 1 are (x1, y1). Pixel coordinates of a top-left corner of the target picture block 2 are (x2, y2). The picture block in which the current neighboring location is located is a picture block 3, and pixel coordinates of a top-left corner of the picture block 3 are (x3, y3). If x1<x0, the target picture block 1 is on a left side of the current picture block. If y2<y0, the target picture block 2 is on an above side of the current picture block. If y3<y0, the picture block 3 is on the above side of the current picture block. In this case, both the picture block 3 and the target picture block 2 are on the above side of the current picture block, and it is only required to compare whether the picture block 3 and the target picture block 2 are the same.

In some implementations of the first aspect, the determining whether the picture block in which the current neighboring location is located is the same as each of the at least one first target picture block includes: determining whether pixel coordinates of a preset location of the picture block in which the current neighboring location is located are the same as pixel coordinates of a preset location of each of the at least one first target picture block; and when the pixel coordinates of the preset location of the picture block in which the current neighboring location is located are different from the pixel coordinates of the preset location of each of the at least one first target picture block, determining that the picture block in which the current neighboring location is located is different from each of the at least one first target picture block.

Optionally, the preset location is any one of a top-left corner, a top-right corner, a bottom-left corner, a bottom-right corner, and a central location of the picture block.

In addition, the preset location may alternatively be another specific location in the picture block. For example, the preset location may alternatively be a central location of a boundary (a left-side boundary, a right-side boundary, an above-side boundary, and a below-side boundary) of the picture block.

In this application, the pixel coordinates of the preset locations of the picture blocks are compared to determine whether the picture block in which the current neighboring location is located is the same as the obtained target picture blocks. Compared with a manner of directly comparing motion information (more parameters need to be compared, including a prediction direction, a reference frame, and a horizontal component and a vertical component of a motion vector), this can reduce comparison operations that need to be performed in the process of constructing the motion information candidate list.

In some implementations of the first aspect, the determining whether the picture block in which the current neighboring location is located is the same as each of the at least one first target picture block includes: determining whether a number of the picture block in which the current neighboring location is located is the same as a number of each of the at least one first target picture block; and when the number of the picture block in which the current neighboring location is located is different from the number of each of the at least one first target picture block, determining that the picture block in which the current neighboring location is located is different from each of the at least one first target picture block.

It should be understood that each picture block corresponds to one number, and there is a one-to-one correspondence between a picture block and a number. The number may be a number defined in an encoding or decoding process.

Optionally, the number may alternatively be a count value, and each picture block corresponds to a unique count value.

In this application, numbers of different picture blocks are compared, and whether two picture blocks are a same picture block can be determined by performing parameter comparison only once. Compared with the manner of comparing motion information, this can reduce comparison operations that need to be performed in the process of constructing the motion information candidate list.

In some implementations of the first aspect, the picture block in which the current neighboring location is located is on the first side of the current picture block, and the method further includes: when no first target picture block on the first side of the current picture block exists in the obtained target picture blocks, determining that the picture block in which the current neighboring location is located is different from each of the obtained target picture blocks.

In this application, when the obtained target picture blocks and the picture block in which the current neighboring location is located are on different sides, it can be directly determined that the picture block in which the current neighboring location is located and the obtained target picture blocks belong to different picture blocks. This can reduce comparison operations that need to be performed in the process of constructing the motion information candidate list.

In some implementations of the first aspect, the method further includes: determining whether the picture block in which the current neighboring location is located is the same as each of the obtained target picture blocks.

In this application, when it is determined whether the picture block in which the current neighboring location is located can be the target picture block, it needs to be determined whether the picture block in which the current neighboring location is located is the same as each of the obtained target picture blocks. Therefore, it is unnecessary to consider whether a picture block that is on a same side as the picture block in which the current neighboring location is located exists in the obtained target picture blocks. This can simplify processing logic for constructing the motion information candidate list.

In some implementations of the first aspect, the N target picture blocks are affine picture blocks, and the candidate motion information of the current picture block is candidate motion information of the control point of the current picture block. The determining candidate motion information of the current picture block based on motion information of the N target picture blocks includes: determining the candidate motion information of the control point of the current picture block based on motion information of control points of the N target picture blocks.

Optionally, the determining the candidate motion information of the control point of the current picture block based on motion information of control points of the N target picture blocks includes: determining the candidate motion information of the control point of the current picture block based on the motion information of the control points of the N target picture blocks and affine models corresponding to the N target picture blocks.

Specifically, when the candidate motion information of the control point of the current picture block is determined based on the motion information of the control points of the N target picture blocks and the affine models corresponding to the N target picture blocks, the candidate motion information of the control point of the current picture block may be determined based on motion information of a control point of each of the N target picture blocks and an affine model corresponding to the picture block.

Optionally, the affine model corresponding to the target picture block includes a 4-parameter affine motion model and a 6-parameter affine motion model.

According to a second aspect, an inter prediction method is provided. The method includes: constructing a motion information candidate list of a current picture block; obtaining a first neighboring location A1 of the current picture block, where A1 is on a left side of the current picture block, and A1 is located in a first neighboring picture block CU 1 of the current picture block; when motion information of the CU 1 is available, determining first candidate motion information of the current picture block based on the motion information of the CU 1, and adding the first candidate motion information to the motion information candidate list; obtaining a second neighboring location B1 of the current picture block, where B1 is on an above side of the current picture block, and B1 is located in a second neighboring picture block CU 2 of the current picture block; when motion information of the CU 2 is available, determining second candidate motion information of the current picture block based on the motion information of the CU 2, and adding the second candidate motion information to the motion information candidate list; obtaining a third neighboring location B0 of the current picture block, where B0 is on the above side of the current picture block, and B0 is located in a third neighboring picture block CU 3 of the current picture block; when motion information of the CU 3 is available, determining whether the CU 3 is the same as the CU 2; when the motion information of the CU 3 is available, and the CU 3 is different from the CU 2, determining third candidate motion information of the current picture block based on the motion information of the CU 3, and adding the third candidate motion information to the motion information candidate list; obtaining a fourth neighboring location A0 of the current picture block, where A0 is on the left side of the current picture block, and A0 is located in a fourth neighboring picture block CU 4 of the current picture block; when motion information of the CU 4 is available, determining whether the CU 4 is the same as the CU 1; when motion information of the CU 4 is available, and the CU 4 is different from the CU 1, determining fourth candidate motion information of the current picture block based on the motion information of the CU 4, and adding the fourth candidate motion information to the motion information candidate list; obtaining a fifth neighboring location B2 of the current picture block, where B2 is on the above side of the current picture block, and B2 is located in a fifth neighboring picture block CU 5 of the current picture block; when motion information of the CU 5 is available, determining whether the CU 5 is the same as the CU 1 and the CU 2; when the motion information of the CU 5 is available, and the CU 5 is different from the CU 1 and the CU 2, determining fifth candidate motion information of the current picture block based on the motion information of the CU 5, and adding the fifth candidate motion information to the motion information candidate list; and performing inter prediction on the current picture block based on the motion information candidate list.

In this application, in a process of constructing the motion information candidate list, neighboring locations of the current picture block are sequentially traversed. In addition, in some cases, whether motion information determined based on a picture block in which a current neighboring location is located needs to be added to the motion information candidate list is determined in a manner of comparing whether the picture blocks are the same. This can reduce comparison operations in the process of constructing the motion information candidate list, thereby improving inter prediction efficiency.

It should be understood that, in the method shown in the second aspect, that the motion information is available means that the CU has been encoded, and more specifically, been inter encoded. Further, when a motion information candidate list in an affine encoding mode is constructed, the CU is further required to be encoded in an affine mode.

It should be understood that, in the method shown in the second aspect, the neighboring locations of the current picture block are traversed in a specific sequence (A1, B1, B0, A0, and B2), and traversing the neighboring locations of the current picture block in the specific sequence can reduce a quantity of comparisons between different picture blocks. For example, because A1 and B1 are respectively on the left side and the above side of the current picture block, when the picture block CU 2 in which B1 is located is obtained, it is unnecessary to compare the CU 2 with the CU 1. Instead, the second candidate motion information determined based on the motion information of the CU 2 may be directly added to the motion information candidate list.

In some implementations of the second aspect, when the CU 3 is the same as the CU 2, the CU 3 is discarded, and the neighboring locations of the current picture block continue to be traversed to obtain the fourth neighboring location A0.

In some implementations of the second aspect, when the CU 4 is the same as the CU 1, the CU 4 is discarded, and the neighboring locations of the current picture block continue to be traversed to obtain the fifth neighboring location B2.

It should be understood that a process in which the inter prediction method in this application is performed on an encoder side is slightly different from a process in which the inter prediction method is performed on a decoder side. When the inter prediction method in this embodiment of this application is performed on the encoder side, optimal motion information needs to be selected from the motion information candidate list, and then inter prediction is performed based on the optimal motion information.

When the inter prediction method in this embodiment of this application is performed on the decoder side, an index of optimal motion information is obtained by parsing a bitstream. Next, the optimal motion information is determined from the motion information candidate list based on the index of the optimal motion information. Then, inter prediction is performed based on the optimal motion information.

According to a third aspect, an inter prediction apparatus is provided. The apparatus includes a module configured to perform the method in any implementation of the first aspect or any implementation of the second aspect.

According to a fourth aspect, a video encoder is provided. The video encoder includes the inter prediction apparatus in the third aspect, an entropy encoding unit, and a reconstruction unit. The inter prediction apparatus is configured to perform inter prediction on a current coding picture block to obtain a prediction block of the current coding picture block. The entropy encoding unit is configured to encode a first identifier into a bitstream. The first identifier is used to indicate candidate motion information that is in a motion information candidate list and that is used to predict motion information of the current coding picture block. The reconstruction unit is configured to reconstruct the current coding picture block based on the prediction block.

According to a fifth aspect, a video decoder is provided. The video decoder includes an entropy decoding unit, the inter prediction apparatus in the third aspect, and a reconstruction unit. The entropy decoding unit is configured to decode a bitstream to obtain a first identifier. The first identifier is used to indicate candidate motion information that is in a motion information candidate list and that is used to predict motion information of a current coding picture block. The inter prediction apparatus is configured to perform inter prediction on the current coding picture block to obtain a prediction block of the current coding picture block. The reconstruction unit is configured to reconstruct the current coding picture block based on the prediction block.

According to a sixth aspect, an encoder is provided. The encoder includes a memory and a processor. The memory stores program code, and the processor is configured to execute the program code stored in the memory. When the program code stored in the memory is executed, the processor is configured to perform the method in any implementation of the first aspect or any implementation of the second aspect.

The encoder may be a video encoder.

According to a seventh aspect, a decoder is provided. The decoder includes a memory and a processor. The memory stores program code, and the processor is configured to execute the program code stored in the memory. When the program code stored in the memory is executed, the processor is configured to perform the method in any implementation of the first aspect or any implementation of the second aspect.

The decoder may be a video decoder.

According to an eighth aspect, an inter prediction apparatus is provided, including a nonvolatile memory and a processor that are coupled to each other. The processor invokes program code stored in the memory to perform some or all steps of the method in any implementation of the first aspect or any implementation of the second aspect.

According to a ninth aspect, a computer-readable storage medium is provided. The computer-readable storage medium stores program code, and the program code includes an instruction used to perform some or all steps of the method in any implementation of the first aspect or any implementation of the second aspect.

According to a tenth aspect, a computer program product is provided. When the computer program product runs on a computer, the computer is enabled to perform an instruction of some or all steps of the method in any implementation of the first aspect or any implementation of the second aspect.

DESCRIPTION OF EMBODIMENTS

The following describes technical solutions of this application with reference to accompanying drawings.

Figure 1:
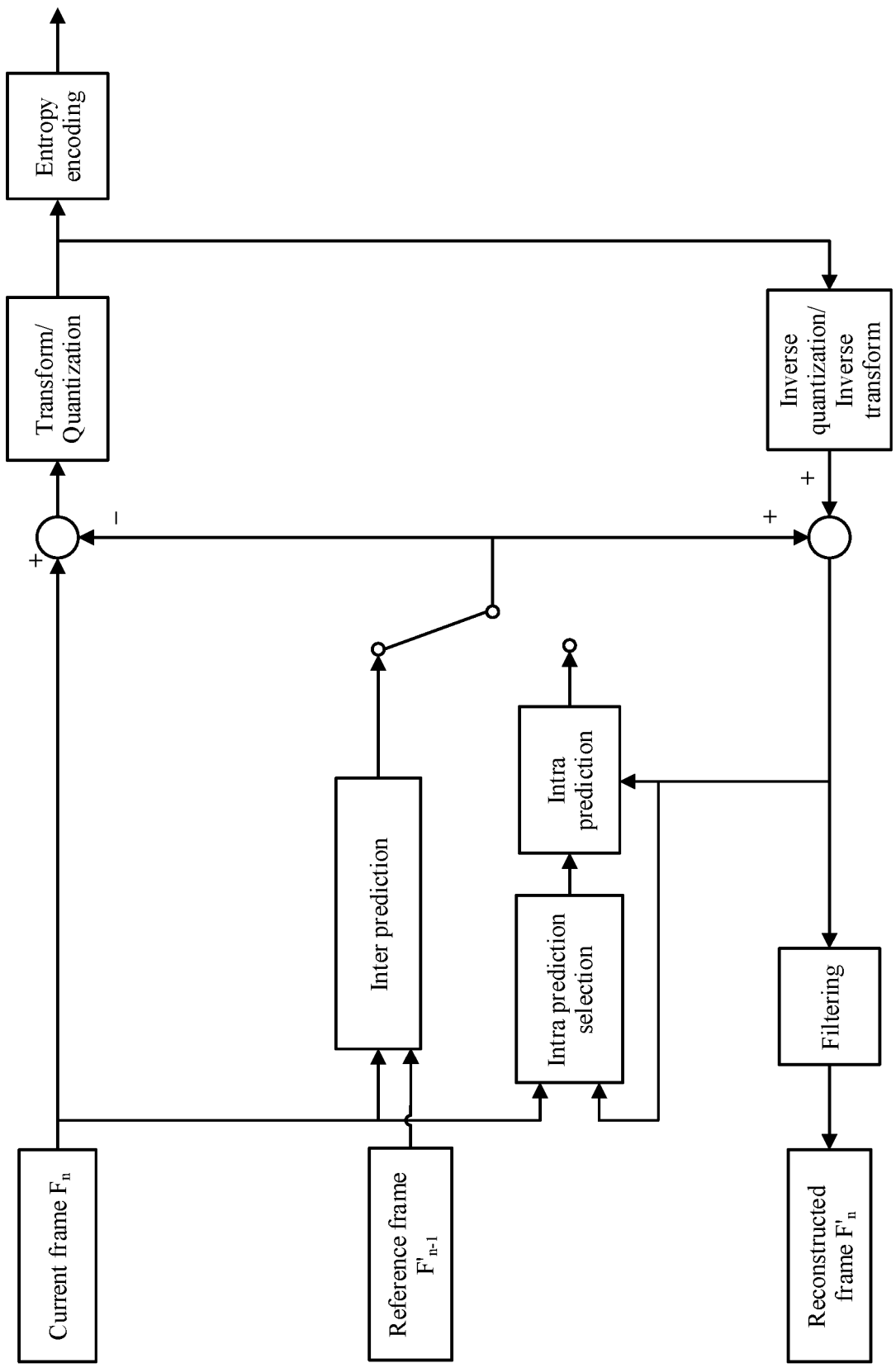
FIG. 1 is a schematic diagram of a video encoding process.
Figure 2:
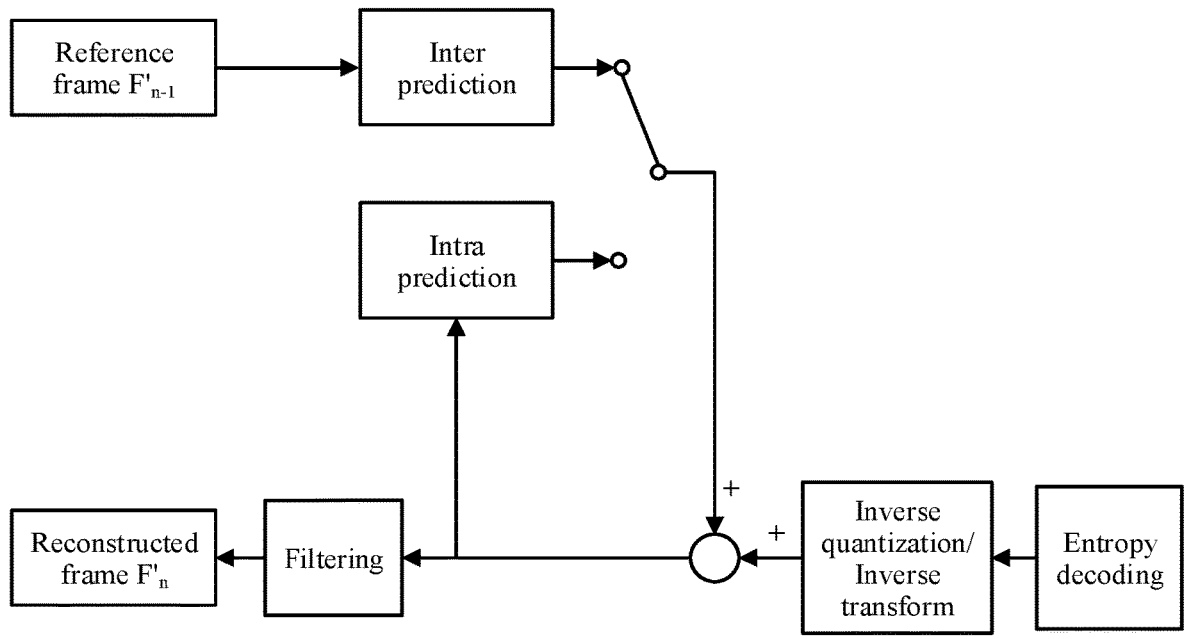
FIG. 2 is a schematic diagram of a video decoding process.

To better understand a process in which the inter prediction method in the embodiments of this application is performed, the following first briefly describes an entire video coding process with reference to FIG. 1 and FIG. 2.

FIG. 1 is a schematic diagram of a video encoding process.

As shown in FIG. 1, when prediction is performed on a current picture block in a current frame $F_n$, either intra prediction or inter prediction can be performed. Specifically, intra coding or inter coding may be selected based on a type of the current frame $F_n$. For example, if the current frame $F_n$ is an I frame, the intra prediction is used. If the current frame $F_n$ is a P frame or a B frame, the inter prediction is used. When the intra prediction is used, a sample value of a sample in the current picture block may be predicted by using a sample value of a sample in a reconstructed area in the current frame $F_n$. When the inter prediction is used, the sample value of the sample in the current picture block may be predicted by using a sample value of a sample in a reference block that is in a reference frame $F'_{n-1}$ and that matches the current picture block.

After a prediction block of the current picture block is obtained according to the inter prediction or the intra prediction, a difference between the sample value of the sample in the current picture block and a sample value of a sample in the prediction block is calculated, to obtain residual information, and transform, quantization, and entropy coding are performed on the residual information, to obtain an encoded bitstream. In addition, in the encoding process, the residual information of the current frame $F_n$ needs to be superposed with prediction information of the current frame $F_n$, and a filtering operation is performed to obtain a reconstructed frame $F'_n$ of the current frame. The reconstructed frame $F'_n$ is used as a reference frame for subsequent encoding.

FIG. 2 is a schematic diagram of a video decoding process.

The video decoding process shown in FIG. 2 is equivalent to an inverse process of the video encoding process shown in FIG. 1. During decoding, entropy decoding, dequantization, and inverse transform are used to obtain residual information, and whether intra prediction or inter prediction is used for a current picture block is determined based on a decoded bitstream. If the intra prediction is used, prediction information is constructed by using a sample value of a sample in a reconstructed area in a current frame and according to an intra prediction method. If the inter prediction is used, motion information needs to be parsed out, a reference block in a reconstructed picture is determined by using the motion information that is parsed out, a sample value of a sample in the reference block is used as prediction information, then the prediction information is superposed with the residual information, and a filtering operation is performed to obtain reconstructed information.

In a conventional inter prediction method, when a motion information candidate list is obtained, currently obtained candidate motion information needs to be compared with obtained candidate motion information one by one. The currently obtained candidate motion information can be added to the motion information candidate list only when the currently obtained candidate motion information is different from the obtained candidate motion information. When whether the currently obtained candidate motion information is the same as the obtained candidate motion information is determined through comparison, a plurality of parameters such as a prediction direction, a corresponding reference frame, and a horizontal component and a vertical component of a motion vector need to be compared. A quantity of comparisons is excessively large, and consequently coding efficiency is reduced.

Generally, to obtain candidate motion information of the current picture block, neighboring locations around the current block are traversed. The candidate motion information of the current picture block is determined based on motion information of picture blocks in which these neighboring locations are located.

Because motion information corresponding to a same picture block is the same, this application provides a new inter prediction method. In this application, picture blocks in which specific neighboring locations are located may be directly determined from the picture blocks in which the neighboring locations around the current picture block are located. The picture blocks in which these specific locations are located are different from each other, and the candidate motion information of the current picture block is determined based on motion information of the picture blocks in which the specific neighboring locations are located. This avoids an operation of comparing the currently obtained motion information with the obtained motion information, and therefore time required for an inter prediction process can be reduced.

The inter prediction method in the embodiments of this application may be performed in the encoding process shown in FIG. 1, or may be performed in the decoding process shown in FIG. 2.

The inter prediction method in the embodiments of this application may be applicable to an AMVP mode and a merge mode in inter prediction.

The following describes in detail the inter prediction method in the embodiments of this application with reference to FIG. 3 to FIG. 11.

Figure 3:
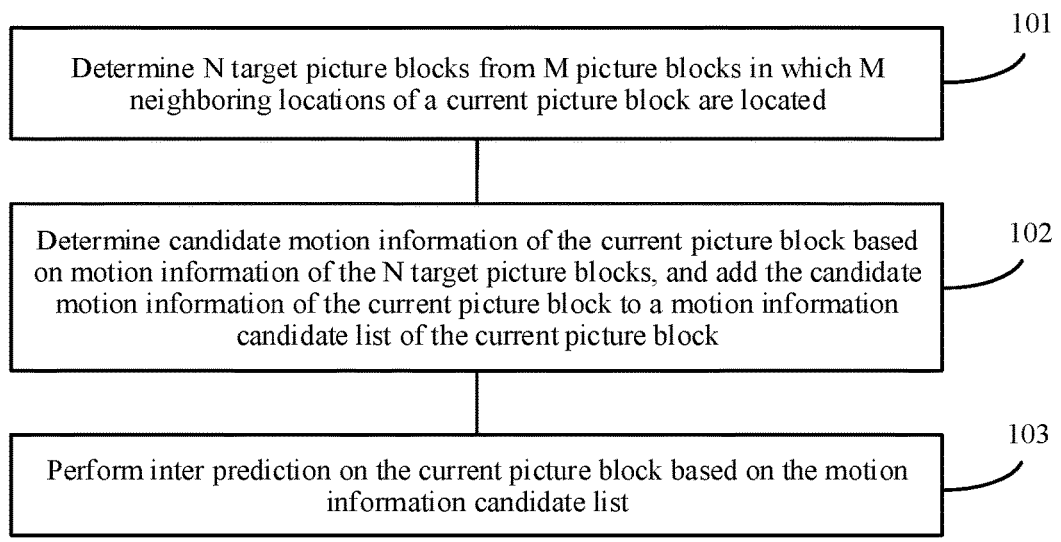
FIG. 3 is a schematic flowchart of an inter prediction method according to an embodiment of this application.

FIG. 3 is a schematic flowchart of an inter prediction method according to an embodiment of this application. The method shown in FIG. 3 may be performed by a video coding apparatus (a video encoding apparatus or a video decoding apparatus), a video codec (a video encoder or a video decoder), a video coding system (a system that can implement both video encoding and video decoding), and another device having a video coding function.

The method shown in FIG. 3 includes step 101 to step 103. The following separately describes step 101 to step 103 in detail.

101: Determine N target picture blocks from M picture blocks in which M neighboring locations of a current picture block are located.

Any two of the N target picture blocks are different. M and N are both positive integers, and M is greater than or equal to N. A value of N may be preset. For example, the value of N may be 5.

In addition, the M neighboring locations may be all or some neighboring locations traversed in a process of obtaining candidate motion information of the current picture block.

Figure 4:
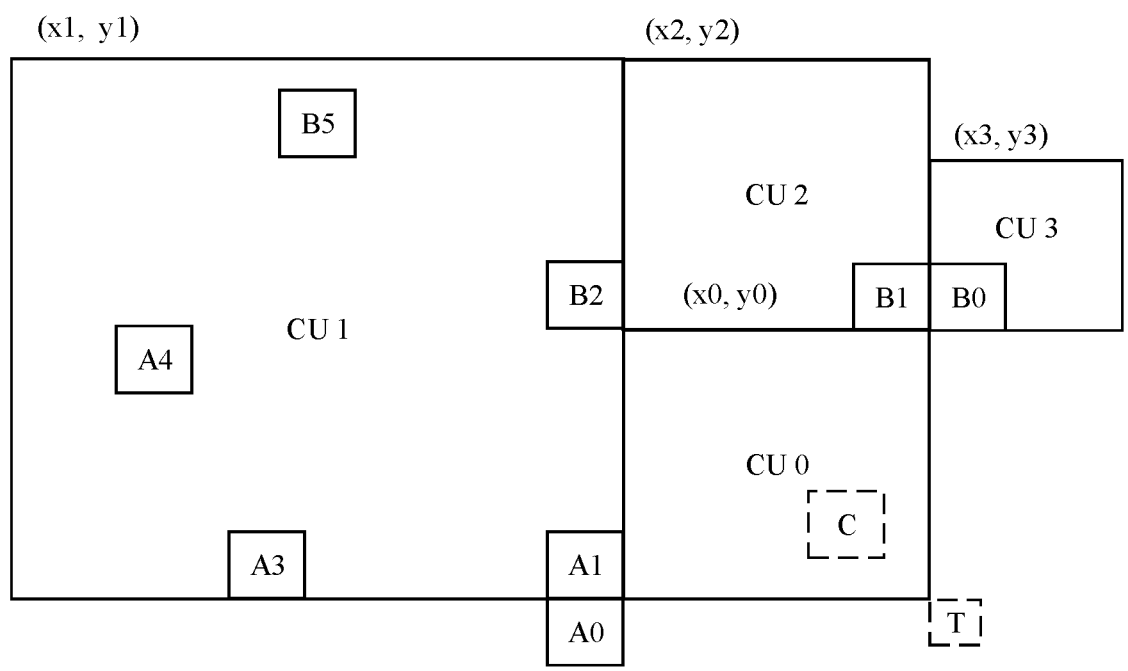
FIG. 4 is a schematic diagram of a neighboring location and a neighboring picture block of a current picture block.

In this application, the neighboring location of the current picture block may be a location adjacent to a boundary of the current picture block. For example, as shown in FIG. 4, the current picture block is a CU 0, and neighboring locations of the current picture block include A0, A1, B0, B1, and B2. Further, in this application, the neighboring location of the current picture block may be extended to a location (for example, a location from which a distance to the boundary of the current picture block is within a specific range) that has a specific distance to the boundary of the current picture block. For example, as shown in FIG. 4, the current picture block is the CU 0, and the neighboring locations of the current picture block may further include A3, A4, and B5. Further, the neighboring locations such as A0, A1, B0, B1, and B2 may be 4×4 subblocks.

As shown in FIG. 4, the current picture block is the CU 0. In this case, M neighboring locations of the CU 0 may include A0, A1, B0, B1, and B2. Further, the M neighboring locations of the CU 0 may further include A3, A4, and B5. In FIG. 4, each neighboring location is located in one CU. Specifically, A1, A2, A3, A4, B2, and B5 are all located in a CU 1, and B1 and B0 are respectively located in a CU 2 and a CU 3. Determining the N picture blocks from the M picture blocks is equivalent to determining the CU 1, the CU 2, and the CU 3 from picture blocks (six CUs 1, one CU 2, and one CU 3) in which A0, A1, A2, A3, A4, B0, B1, B2, and B5 are located.

It should be understood that, in this application, the neighboring location of the current picture block may be a spatially neighboring location or a temporally neighboring location.

Therefore, the M neighboring locations may include only spatially neighboring locations of the current picture block, or may include only temporally neighboring locations of the current picture block, or may include both a spatially neighboring location of the current picture block and a temporally neighboring location of the current picture block. Correspondingly, the M picture blocks may include only spatially neighboring picture blocks of the current picture block, or may include only temporally neighboring picture blocks of the current picture block, or may include both a spatially neighboring picture block of the current picture block and a temporally neighboring picture block of the current picture block.

102: Determine the candidate motion information of the current picture block based on motion information of the N target picture blocks, and add the candidate motion information of the current picture block to a motion information candidate list of the current picture block.

It should be understood that, in step 102, the motion information of the current picture block may be determined based on the motion information of the N target picture blocks after the N target picture blocks are all obtained, or the candidate motion information of the current picture block may be determined based on a currently obtained target picture block each time the target picture block is obtained.

The inter prediction method in this embodiment of this application may be applicable to inter prediction based on a translational motion model, and may also be applicable to inter prediction based on a non-translational motion model.

Optionally, determining the candidate motion information of the current picture block based on the motion information of the N target picture blocks includes: determining candidate motion information of a control point of the current picture block based on motion information of control points of the N target picture blocks.

It should be understood that, in the non-translational motion model, the inter prediction method in this embodiment of this application may be specifically an inherited control point motion vector prediction method. In this case, the candidate motion information of the current picture block is actually the candidate motion information of the control point of the current picture block.

In the inherited control point motion vector prediction method, a motion vector of the control point of the current picture block is derived by using a motion vector of a control point of a neighboring encoded affine coding block and a motion model of the affine coding block.

For example, if the current picture block has a first neighboring picture block, and the first neighboring picture block is an affine coding block, motion information of the control point of the current picture block may be derived based on motion information of a control point of the first neighboring picture block and an affine model corresponding to the first neighboring picture block.

Optionally, determining the candidate motion information of the current picture block based on the motion information of the N target picture blocks includes: determining the motion information of the N target picture blocks as the candidate motion information of the current picture block.

It should be understood that, in the translational motion model, motion information of each location of each picture block is the same. Therefore, motion information of a neighboring picture block of the current picture block may be directly determined as the candidate motion information of the current picture block.

103: Perform inter prediction on the current picture block based on the motion information candidate list.

In this application, different target picture blocks are determined from picture blocks in which a plurality of neighboring locations of the current picture block are located, so that the candidate motion information of the current block can be directly determined based on the obtained target picture blocks. In addition, the candidate motion information is directly added to the motion information candidate list without comparing whether the candidate motion information is the same. This reduces comparison operations during obtaining of the motion information candidate list, thereby improving inter prediction efficiency.

Optionally, in an embodiment, determining the N target picture blocks from the M picture blocks in which the M neighboring locations of the current picture block are located includes: determining a picture block in which a current neighboring location of the current picture block is located; and when the picture block in which the current neighboring location is located is different from each of the obtained target picture blocks, determining the picture block in which the current neighboring location is located as a target picture block of the current picture block.

It should be understood that, when the picture block in which the current neighboring location is located is the same as at least one first target picture block in the obtained target picture blocks, it indicates that a picture block that is the same as the picture block in which the current neighboring location is located exists in the obtained target picture blocks. To avoid subsequently obtaining repeated candidate motion information, the picture block in which the current neighboring location is located needs to be discarded, and then a next neighboring location of the current picture block continues to be traversed.

To further reduce a quantity of comparisons in a process of constructing the motion information candidate list, only picture blocks on different sides of the current picture block may be compared. For the picture blocks located on different sides of the current picture block, it may be directly determined, without comparison, that the picture blocks that are currently located on different sides of the current block are different picture blocks.

Optionally, when the picture block in the current neighboring location is located is on a first side of the current picture block, the method shown in FIG. 3 further includes: when at least one first target picture block on the first side of the current picture block exists in the obtained target picture blocks, determining whether the picture block in which the current neighboring location is located is the same as each of the at least one first target picture block; and when the picture block in which the current neighboring location is located is different from each of the at least one first target picture block, determining that the picture block in which the current neighboring location is located is different from each of the obtained target picture blocks.

Further, the method shown in FIG. 3 includes: when no first target picture block on the first side of the current picture block exists in the obtained target picture blocks, determining that the picture block in which the current neighboring location is located is different from each of the obtained target picture blocks.

It should be understood that, when no first target picture block on the first side of the current picture block exists in the obtained target picture blocks (the obtained target picture blocks are not located on the first side of the current picture block), it may be directly determined that the picture block in which the current neighboring location is located is different from any one of the obtained target picture blocks.

In other words, before the target picture block of the current picture block is determined based on the picture block in which the current neighboring location is located, it may be first determined whether a target picture block that is on the same side (the same side of the current picture block) as the picture block in which the current neighboring location is located exists in the obtained target picture blocks. If no target picture block that is on the same side as the picture block in which the current neighboring location is located exists in the obtained target picture blocks, the picture block in which the current neighboring location is located may be directly determined as the target picture block.

However, if the target picture block that is on the same side as the picture block in which the current neighboring location is located exists in the obtained target picture blocks, subsequently, only the target picture block that is on the same side as the picture block in which the current neighboring location is located needs to be compared with the picture block in which the current neighboring location is located. If no picture block that is the same as the picture block in which the current neighboring location is located exists in target picture blocks on the same side as the picture block in which the current neighboring location is located, the picture block in which the current neighboring location is located may be determined as the target picture block of the current picture block.

It should be understood that, two neighboring picture blocks being on a same side of the current picture block may mean that the two neighboring picture blocks are both on the left side or the above side of the current picture block. In addition, different neighboring picture blocks being on a same side or different sides of the current picture block is relative to spatially neighboring picture blocks of the current picture block. There are concepts of a same side and different sides only between spatially neighboring picture blocks.

Optionally, in an embodiment, the method further includes: determining whether the at least one first target picture block on the first side of the current picture block exists in the obtained target picture blocks.

It should be understood that, whether the obtained target picture blocks are on the first side of the current picture block may be determined based on coordinates of the obtained target picture blocks and coordinates of the current picture block.

Determining whether a picture block on the first side of the current picture block exists in the obtained target picture blocks may also be considered as determining whether the target picture block that is on the same side as the picture block in which the current neighboring location is located exists in the obtained target picture blocks (because in this case, the picture block in which the current neighboring location is located is on the first side of the current picture block).

Optionally, in an embodiment, the determining whether the at least one first target picture block on the first side of the current picture block exists in the obtained target picture blocks includes: determining, based on pixel coordinates of preset locations of the obtained target picture blocks and pixel coordinates of a preset location of the current picture block, whether the obtained target picture blocks are on the first side of the current picture block.

The preset location may be the top-left corner (or the top-right corner or another specific location) of the picture block.

For example, as shown in FIG. 4, pixel coordinates of the top-left corner of the current picture block are (x0, y0). The obtained target picture blocks include a target picture block 1 and a target picture block 2. Pixel coordinates of the top-left corner of the target picture block 1 are (x1, y1). Pixel coordinates of the top-left corner of the target picture block 2 are (x2, y2). The picture block in which the current neighboring location is located is a picture block 3, and pixel coordinates of the top-left corner of the picture block 3 are (x3, y3). If x1<x0, the target picture block 1 is on the left side of the current picture block. If y2<y0, the target picture block 2 is on the above side of the current picture block. If y3<y0, the picture block 3 is on the above side of the current picture block. In this case, both the picture block 3 and the target picture block 2 are on the above side of the current picture block, and it is only required to compare whether the picture block 3 and the target picture block 2 are the same.

For example, as shown in FIG. 4, the current picture block is a CU 0, and neighboring picture blocks of the current picture block include a CU 1, a CU 2, and a CU 3. The CU 1 is on the left side of the CU 0, and both the CU 2 and the CU 3 are on the above side of the CU 0. Therefore, the CU 2 and the CU 3 are on a same side of the CU 0, the CU 1 and the CU 2 are on different sides of the CU 0, and the CU 2 and the CU 3 are also on the same side of the CU 0.

As shown in FIG. 4, it is assumed that a current neighboring location is B0, a picture block in which B0 is located is the CU 3, and the CU 3 is on the above side of the CU 0. If no picture block on the above side of the CU 0 exists in obtained target picture blocks, it may be directly determined that the CU 3 is different from each of the obtained target picture blocks. In this case, the CU 3 may be directly determined as a target picture block of the CU 0. However, if the picture block CU 2 on the above side of the CU 0 exists in the obtained target picture blocks, whether the CU 2 and the CU 3 are the same further needs to be compared. After comparison, the CU 2 and the CU 3 are different picture blocks. In this case, the CU 3 may be determined as the target picture block of the CU 0.

Figure 5:
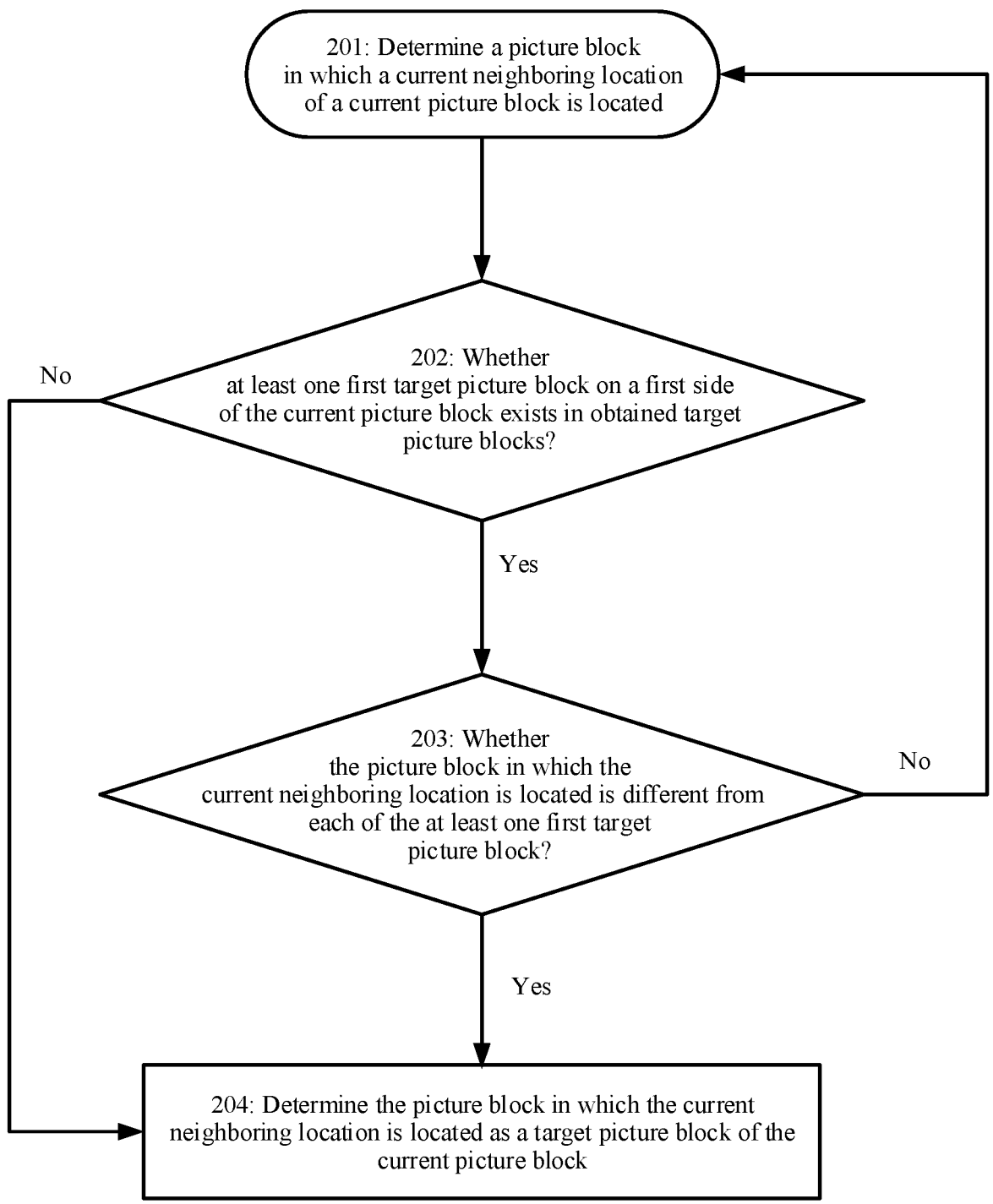
FIG. 5 is a flowchart of an inter prediction method according to an embodiment of this application.
Figure 6:
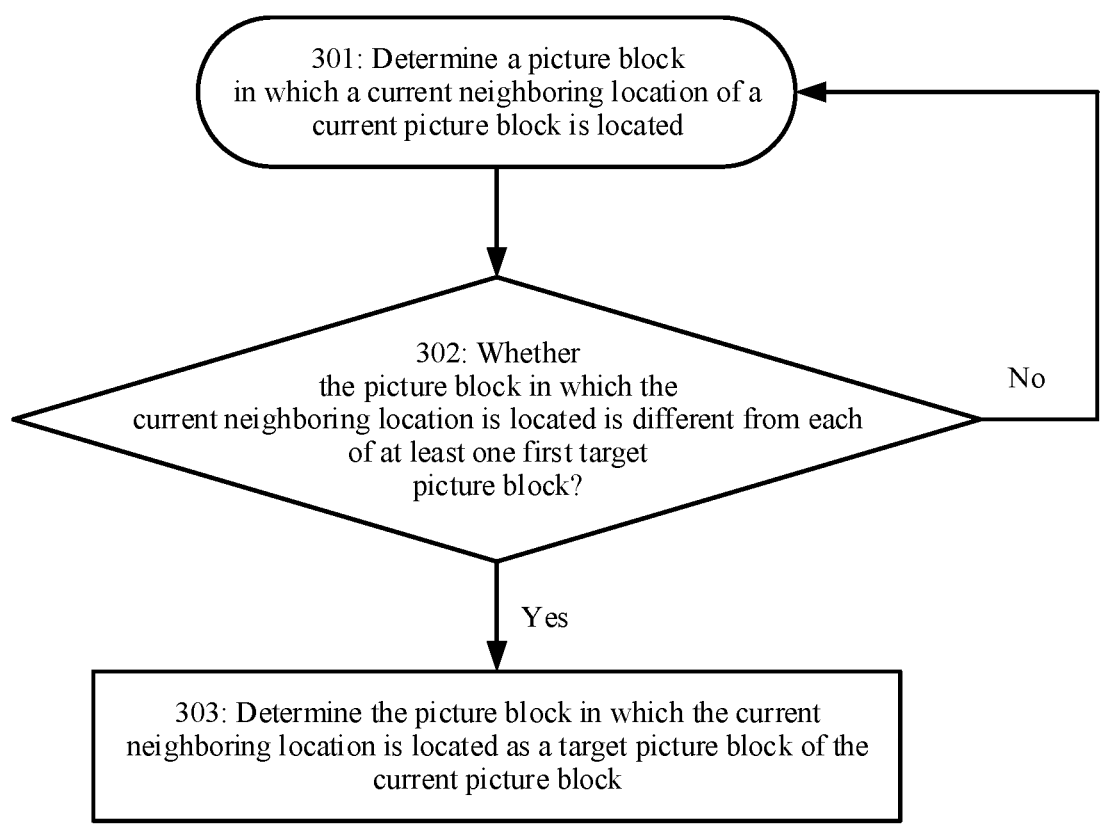
FIG. 6 is a flowchart of an inter prediction method according to an embodiment of this application.
Figure 7:
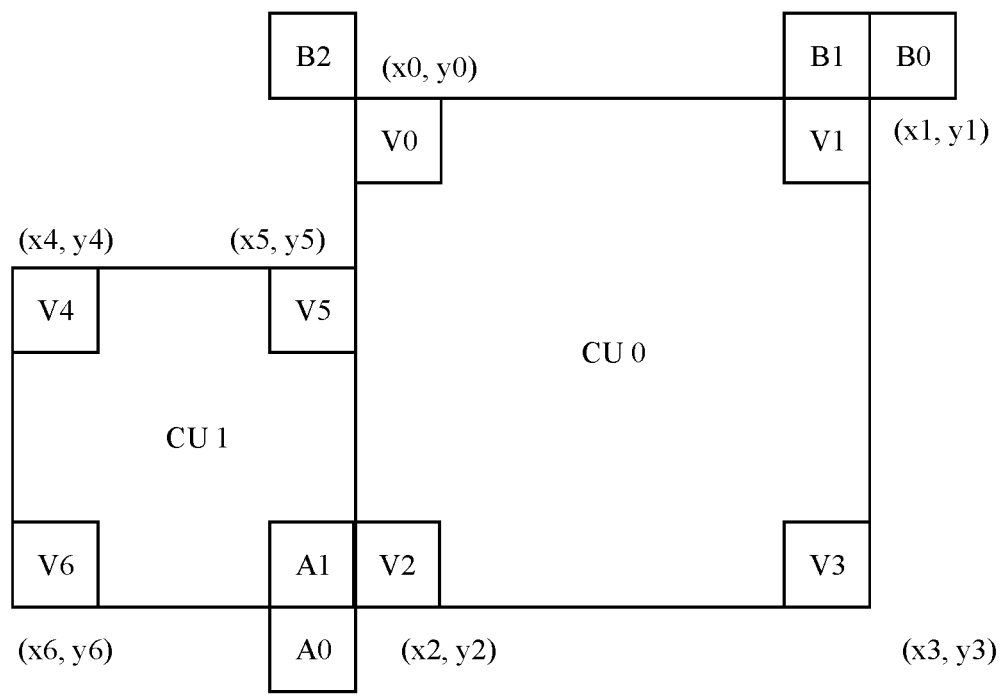
FIG. 7 is a schematic diagram of a neighboring location and a neighboring picture block of a current picture block.

The following describes in detail the foregoing comparison process with reference to FIG. 5 to FIG. 7.

FIG. 5 is a schematic flowchart of determining the target picture block of the current picture block according to this embodiment of this application. FIG. 5 shows a process of determining the target picture block of the current picture block based on each current neighboring location. The process shown in FIG. 5 may be considered as refinement of step 101. The process shown in FIG. 5 includes step 201 to step 204. The following describes step 201 to step 204 in detail.

201: Determine the picture block in which the current neighboring location of the current picture block is located.

Explanations of the neighboring location and the picture block in step 101 are also applicable to step 201. For brevity, details are not described herein again.

202: Determine whether the at least one first target picture block on the first side of the current picture block exists in the obtained target picture blocks.

It should be understood that the picture block in which the current neighboring location is located is on the first side of the current picture block, and the process in step 202 is to determine whether a picture block that is on the same side as the picture block in which the current neighboring location is located exists in the obtained target picture blocks.

When it is determined in step 202 that the at least one first target picture block exists in the obtained target picture blocks, whether the picture block in which the current neighboring location is located is the same as each of the at least one first target picture block further needs to be compared. In other words, step 203 is performed.

When it is determined in step 202 that the at least one first target picture block does not exist in the obtained target picture blocks, it may be considered that each of the obtained target picture blocks is different from the picture block in which the current neighboring location is located. In this case, the picture block in which the current neighboring location is located may be directly determined as a target picture block of the current picture block. In other words, step 204 is directly performed.

203: Determine whether the picture block in which the current neighboring location is located is different from each of the at least one first target picture block.

If it is determined in step 203 that the picture block in which the current neighboring location is located is different from each of the at least one first target picture block obtained in step 202, it may be considered that the picture block in which the current neighboring location is located is different from the obtained target picture blocks. In this case, the picture block in which the current neighboring location is located may be determined as the target picture block of the current picture block. In other words, step 204 is performed.

If it is determined in step 203 that the picture block in which the current neighboring location is located is the same as some of the at least one first target picture block, the picture block in which the current neighboring location is located needs to be discarded, and the picture block in which the neighboring location of the current picture block is located continues to be traversed. In other words, step 201 is performed.

204: Determine the picture block in which the current neighboring location is located as a target picture block of the current picture block.

It should be understood that step 201 to step 204 may be considered as a process of determining the target picture block of the current picture block. Actually, to determine the N target picture blocks from the M picture blocks in which the M neighboring locations of the current picture block are respectively located in step 101, step 201 to step 204 may be repeatedly performed for a plurality of times until a quantity of obtained target picture blocks reaches a preset quantity or meets a preset requirement.

The following uses FIG. 4 as an example to describe a process in step 201 to step 204. As shown in FIG. 4, it is assumed that the current picture block is the CU 0. In this case, the current neighboring location is B0, and the picture block in which the current neighboring location B0 is located is the CU 3. It is assumed that only the CU 2 in the obtained target picture blocks is on the above side of the CU 0. In this case, only whether the CU 3 and the CU 2 are the same needs to be compared. As shown in FIG. 4, the CU 3 and the CU 2 belong to different picture blocks. Therefore, the CU 3 may be determined as a target picture block of the current picture block.

Whether the picture block in which the current neighboring location is located is the same as each of the at least one first target picture block may be determined by comparing whether pixel coordinates of a specific location of the picture block in which the current neighboring location is located are the same as pixel coordinates of a specific location of each first target picture block, or by directly comparing a number of the picture block in which the neighboring location is located with a number of each first target picture block. When the pixel coordinates of the specific locations are the same or the numbers of the picture blocks are the same, it may be considered that the two picture blocks are the same.

Therefore, in this application, the determining whether the picture block in which the current neighboring location is located is the same as each of the at least one first target picture block specifically includes the following two implementations:

In a first implementation, pixel coordinates of specific locations are compared to determine whether the picture blocks are the same.

A specific comparison process included in the first implementation is as follows:

(1) Determine whether pixel coordinates of a preset location of the picture block in which the current neighboring location is located are the same as pixel coordinates of a preset location of each of the at least one first target picture block.

(2) When the pixel coordinates of the preset location of the picture block in which the current neighboring location is located are different from the pixel coordinates of the preset location of each of the at least one first target picture block, determine that the picture block in which the current neighboring location is located is different from each of the at least one first target picture block.

It should be understood that, in the first implementation, if the pixel coordinates of the preset location of the picture block in which the current neighboring location is located are completely the same as pixel coordinates of a preset location of a first target picture block in the at least one first target picture block, it may be determined that the picture block in which the current neighboring location is located is the same as the first target picture block.

Optionally, in the first implementation, the preset location may be the top-left corner, the top-right corner, the bottom-left corner, the bottom-right corner, the central location, or the like of the picture block.

It should be understood that the foregoing is merely several cases of the preset location. Actually, the preset location herein may alternatively be any other specific location (for example, a location of the center point on the above side, the below side, the left side, or the right side of the picture block) of the picture block. This is not limited in this application.

In a second implementation, the numbers of the picture blocks are compared to determine whether the picture blocks are the same.

A specific comparison process included in the second implementation is as follows:

(3) Determine whether the number of the picture block in which the current neighboring location is located is the same as the number of each of the at least one first target picture block.

(4) When the number of the picture block in which the current neighboring location is located is different from the number of each of the at least one first target picture block, determine that the picture block in which the current neighboring location is located is different from each of the at least one first target picture block.

It should be understood that, in the second implementation, if the number of the picture block in which the current neighboring location is located is the same as a number of a first target picture block in the at least one first target picture block, it may be determined that the picture block in which the current neighboring location is located is the same as the first target picture block.

Optionally, in the second implementation, each picture block corresponds to a unique number, and there is a one-to-one correspondence between a picture block and a number. The number of the picture block may be a number set for each picture block in a coding process. Further, the number herein may also be referred to as an identity (identity, ID) number.

Optionally, in an embodiment, the method shown in FIG. 3 further includes: determining whether the picture block in which the current neighboring location is located is the same as each of the obtained target picture blocks.

To be specific, in the method shown in FIG. 3, whether the picture block that is on the same side as the picture block in which the current neighboring location is located exists in the obtained target picture blocks may not be considered. Instead, the picture block in which the current neighboring location is located is compared with each of the obtained target picture blocks one by one, to determine whether the picture block in which the current neighboring location is located is the same as each of the obtained target picture blocks.

FIG. 6 shows a process of determining whether the picture block in which the current neighboring location is located is the same as each of the obtained target picture blocks in this embodiment of this application.

The process shown in FIG. 6 includes step 301 to step 303. The following describes step 301 to step 303 in detail.

301: Determine the picture block in which the current neighboring location of the current picture block is located.

302: Determine whether the picture block in which the current neighboring location is located is different from each of the at least one first target picture block.

It should be understood that the at least one first target picture block is a picture block that is in the obtained target picture blocks and that is on the same side as the picture block in which the current neighboring location is located.

For example, it is assumed that the picture block in which the current neighboring location is located is on the above side of the current picture block. In this case, the at least one first target picture block is a picture block on the above side of the current picture block.

When it is determined in step 302 that the picture block in which the current neighboring location is located is different from each of the at least one first target picture block, it may be considered that the picture block in which the current neighboring location is located is different from the obtained target picture blocks of the current picture block. In this case, the picture block in which the current neighboring location is located may be directly determined as a target picture block of the current picture block.

If it is determined in step 302 that the picture block in which the current neighboring location is located is the same as some of the at least one first target picture block, the picture block in which the current neighboring location is located needs to be discarded, and the picture block in which the neighboring location of the current picture block is located continues to be traversed. In other words, step 301 is performed.

303: Determine the picture block in which the current neighboring location is located as a target picture block of the current picture block.

Optionally, in an embodiment, when the N target picture blocks are affine picture blocks, the candidate motion information of the current picture block is specifically the candidate motion information of the control point of the current picture block. In this case, step 102 in the method shown in FIG. 3 specifically includes: determining the candidate motion information of the control point of the current picture block based on the motion information of the control points of the N target picture blocks.

It should be understood that, when the candidate motion information of the control point of the current picture block is determined based on motion information of a control point of each of the N target picture blocks, specifically, the candidate motion information of the control point of the current picture block may be determined based on the motion information of the control point of each target picture block and an affine model corresponding to the target picture block.

The affine model is actually a specific prediction model in the non-translational motion model. In non-translational motion model-based prediction, a same motion model is used on an encoder side and a decoder side to derive motion information of each sub-motion compensation unit in a current coding block, and motion compensation is performed based on the motion information of the sub-motion compensation unit to obtain a prediction block, to improve prediction efficiency.

The affine model may include a 4-parameter affine motion model and a 6-parameter affine motion model. Types of models specifically included in the affine model are not limited in this application.

The following separately describes in detail the 4-parameter affine motion model and the 6-parameter affine motion model.

The 4-parameter affine motion model may be expressed as a formula (1):

$$\begin{cases} vx = a_1 + a_3 x + a_4 y \\ vy = a_2 - a_4 x + a_3 y \end{cases} \quad (1)$$

As shown in the formula (1), the 4-parameter affine motion model may be represented by using motion vectors of two samples and coordinates of the two samples relative to a pixel in the top-left corner of the current picture block. A sample used to represent a motion model parameter is denoted to as a control point.

If the sample in the top-left corner (0, 0) and a sample in the top-right corner (W, 0) are used as control points, motion vectors $(vx_0, vy_0)$ and $(vx_1, vy_1)$ of the control points in the top-left corner and the top-right corner of the current coding block are first determined. Then, the motion information of each sub-motion compensation unit in the current coding block is derived according to a formula (2). (x, y) is coordinates of the sub-motion compensation unit relative to the pixel in the top-left corner of the current coding block, and W is the width of the current coding block.

$$\begin{cases} vx = \dfrac{vx_1 - vx_0}{W} - \dfrac{vy_1 - vy_0}{W} y + vx_0 \\ vy = \dfrac{vy_1 - vy_0}{W} + \dfrac{vx_1 - vx_0}{W} y + vy_0 \end{cases} \quad (2)$$

The 6-parameter affine motion model is expressed as a formula (3):

$$\begin{cases} vx = a_1 + a_3 x + a_4 y \\ vy = a_2 + a_5 x + a_6 y \end{cases} \quad (3)$$

The 6-parameter affine motion model may be represented by motion vectors of three samples and coordinates of the three samples relative to the pixel in the top-left corner of the current coding block.

If the sample in the top-left corner (0, 0), the sample in the top-right corner (W, 0), and a sample in the bottom-left corner (0, H) are used as control points, motion vectors $(vx_0, vy_0)$, $(vx_1, vy_1)$, and $(vx_2, vy_2)$ of the control points in the top-left corner, the top-right corner, and the bottom-left corner of the current coding block are first determined. Then, the motion information of each sub-motion compensation unit in the current coding block is derived according to a formula (4). (x, y) is the coordinates of the sub-motion compensation unit relative to the pixel in the top-left corner of the current coding block, and W and H are respectively the width and the height of the current coding block.

$$\begin{cases} vx = \dfrac{vx_1 - vx_0}{W} + \dfrac{vx_2 - vy_0}{H} y + vx_0 \\ vy = \dfrac{vy_1 - vy_0}{W} + \dfrac{vy_2 - vx_0}{H} y + vy_0 \end{cases} \quad (4)$$

It should be understood that, in the inherited control point motion vector prediction method, the motion vector of the control point of the current block is derived by using the motion model of the neighboring encoded affine coding block.

With reference to FIG. 7, the following use A1 as an example to describe a process of deriving the motion information of the control point of the current picture block based on motion information of a control point of the target picture block.

As shown in FIG. 7, a coding block in which A1 is located is a CU 1, and the current picture block is a CU 0. If the CU 1 is a 4-parameter affine coding block, a motion vector $(vx_4, vy_4)$ in the top-left corner (x4, y4) and a motion vector $(vx_5, vy_5)$ in the top-right corner $(x_5, y_5)$ of the block CU 1 are obtained. After motion information of a control point of the CU 1 is obtained, a motion vector $(vx_0, vy_0)$ in the top-left corner $(x_0, y_0)$ of the CU 0 is obtained through calculation according to a formula (5), and a motion vector $(vx_1, vy_1)$ in the top-right corner $(x_1, y_1)$ of the CU 0 is obtained through calculation according to a formula (6).

$$\begin{cases} vx_0 = vx_4 + \dfrac{vx_5 - vx_4}{x_5 - x_4} \times (x_0 - x_4) + \dfrac{vx_6 - vx_4}{y_6 - x_4} \times (y_0 - y_4) \\ vy_0 = vy_4 + \dfrac{vy_5 - vy_4}{x_5 - x_4} \times (x_0 - x_4) + \dfrac{vy_6 - vy_4}{y_6 - x_4} \times (y_0 - y_4) \end{cases} \quad (5)$$

$$\begin{cases} vx_1 = vx_4 + \dfrac{vx_5 - vx_4}{x_5 - x_4} \times (x_1 - x_4) + \dfrac{vx_6 - vx_4}{y_6 - x_4} \times (y_1 - y_4) \\ vy_1 = vy_4 + \dfrac{vy_5 - vy_4}{x_5 - x_4} \times (x_1 - x_4) + \dfrac{vy_6 - vy_4}{y_6 - x_4} \times (y_1 - y_4) \end{cases} \quad (6)$$

If the CU 1 is a 6-parameter affine coding block, a motion vector $(vx_4, vy_4)$ in the top-left corner (x4, y4), a motion vector $(vx_5, vy_5)$ in the top-right corner (x5, y5), and a motion vector $(vx_6, vy_6)$ in the bottom-left corner (x6, y6) of the CU 1 are obtained. Next, a motion vector $(vx_0, vy_0)$ in the top-left corner $(x_0, y_0)$ of the CU 0 is obtained through calculation according to a formula (7); a motion vector $(vx_1, vy_1)$ in the top-right corner $(x_1, y_1)$ of the current affine coding block is obtained through calculation according to a formula (8); and a motion vector $(vx_2, vy_2)$ in the bottom-left corner $(x_2, vy_2)$ of the current affine coding block is obtained through calculation according to a formula (9):

$$\begin{cases} vx_0 = vx_4 + \dfrac{vx_5 - vx_4}{x_5 - x_4} \times (x_0 - x_4) + \dfrac{vx_6 - vx_4}{y_6 - x_4} \times (y_0 - y_4) \\ vy_0 = vy_4 + \dfrac{vy_5 - vy_4}{x_5 - x_4} \times (x_0 - x_4) + \dfrac{vy_6 - vy_4}{y_6 - x_4} \times (y_0 - y_4) \end{cases} \quad (8)$$

$$\begin{cases} vx_1 = vx_4 + \dfrac{vx_5 - vx_4}{x_5 - x_4} \times (x_1 - x_4) + \dfrac{vx_6 - vx_4}{y_6 - x_4} \times (y_1 - y_4) \\ vy_1 = vy_4 + \dfrac{vy_5 - vy_4}{x_5 - x_4} \times (x_1 - x_4) + \dfrac{vy_6 - vy_4}{y_6 - x_4} \times (y_1 - y_4) \end{cases} \quad (9)$$

-continued $$\begin{cases} vx_2 = vx_4 + \dfrac{vx_5 - vx_4}{x_5 - x_4} \times (x_2 - x_4) + \dfrac{vx_6 - vx_4}{y_6 - x_4} \times (y_2 - y_4) \\ vy_2 = vy_4 + \dfrac{vy_5 - vy_4}{x_5 - x_4} \times (x_2 - x_4) + \dfrac{vy_6 - vy_4}{y_6 - x_4} \times (y_2 - y_4) \end{cases} \quad (10)$$

It should be understood that when the candidate motion information of the control point of the current picture block is calculated based on the motion information of the control point of the target picture block and a corresponding affine model, a method for using other control points to represent motion models of a neighboring coding block and the current coding block is also applicable to this application, and details are not described herein again.

Optionally, in an embodiment, when the N target picture blocks are normal picture blocks (non-affine picture blocks), step 102 in the method shown in FIG. 3 specifically includes: determining the motion information of the N target picture blocks as the candidate motion information of the current picture block.

The foregoing describes in detail the inter prediction method in the embodiments of this application with reference to FIG. 2 to FIG. 7. It should be understood that the method described in FIG. 2 to FIG. 7 may be performed on both the encoder side and the decoder side, and may be applicable to both the inter prediction in the non-translational model and the inter prediction in the translational model.

With reference to specific examples, the following describes in detail in detail processes of obtaining a motion information candidate list in inter prediction in the embodiments of this application in different models.

Example 1: Manner 1 of Constructing the Motion Information Candidate List in an Affine Mode In Example 1, each time an affine coding block that meets a requirement is found, candidate motion information of a current picture block is determined based on motion information of a control point of the affine coding block, and the obtained candidate motion information is added to the motion information candidate list.

Figure 8:
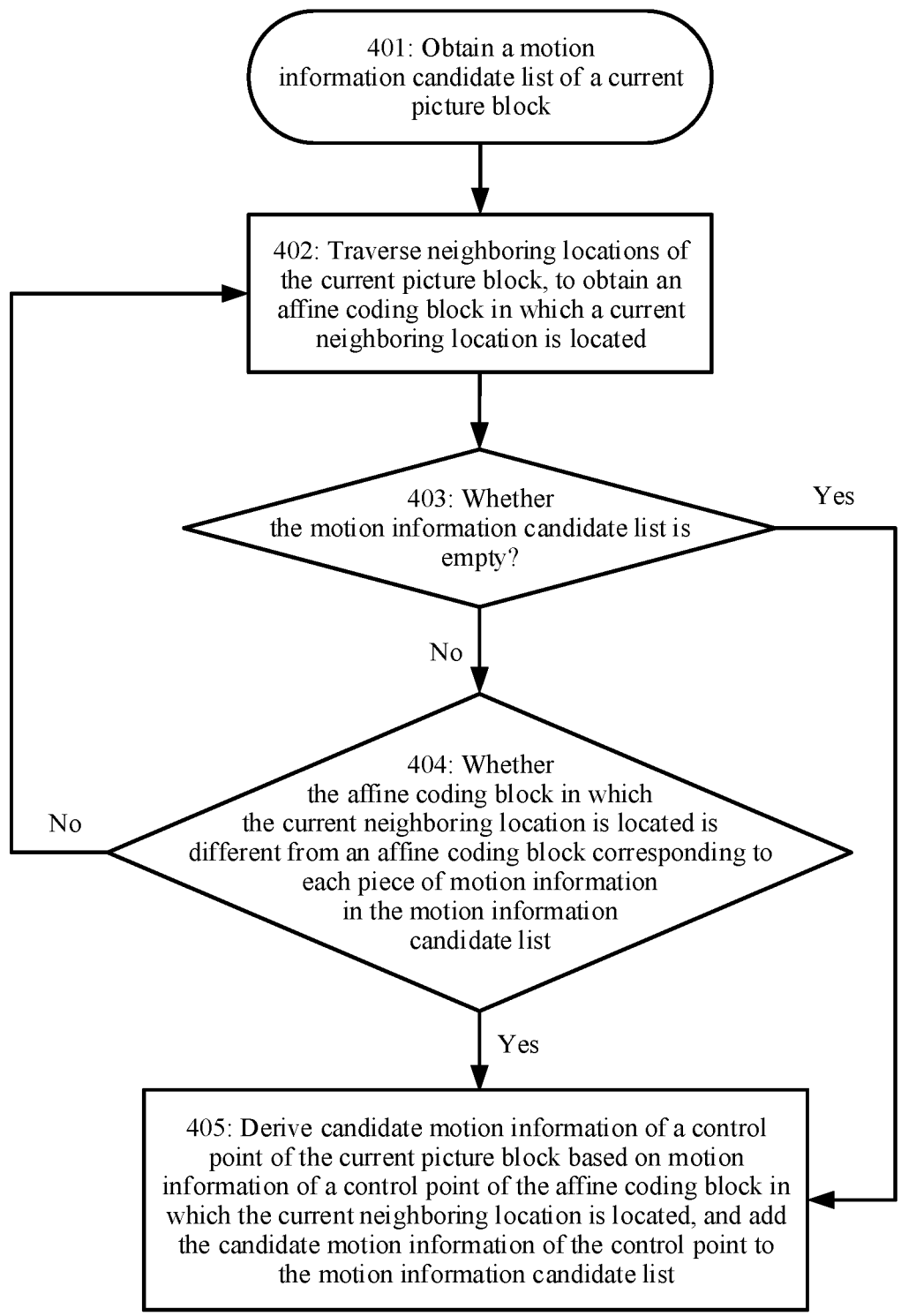
FIG. 8 is a flowchart of an inter prediction method according to an embodiment of this application.

In Example 1, candidate motion information of a control point of the current picture block is mainly derived by using an inherited control point motion vector prediction method, and the derived candidate motion information of the control point is added to the motion information candidate list. A specific process of Example 1 is shown in FIG. 8. The process shown in FIG. 8 includes step 401 to step 405, and the following describes step 401 to step 405 in detail.

401: Obtain a motion information candidate list of the current picture block.

The motion information candidate list obtained in step 401 may be a motion information candidate list newly established for the current picture block (in this case, the motion information candidate list is empty and does not include any motion information). Alternatively, the motion information candidate list is a motion information candidate list already established for the current picture block, and the motion information candidate list already includes some motion information.

402: Traverse neighboring locations of the current picture block, to obtain an affine coding block in which a current neighboring location is located.

It should be understood that, in Example 1, an affine coding model is used as an example to describe the inter prediction method in the embodiments of this application. Therefore, in step 402, in a process of traversing the neighboring locations of the current picture block, whether a picture block in which the traversed neighboring location is located is an affine coding block further needs to be determined. If the picture block is an affine coding block, the affine coding block may be obtained, and the candidate motion information of the control point of the current picture block is derived based on motion information of a control point of the affine coding block. If a picture block in which a neighboring location is located is a translational block, the candidate motion information of the control point of the current picture block cannot be derived based on the translational block. Therefore, in the step S402, if a picture block in which a neighboring location is located is the translational block, another neighboring location of the current picture block needs to be continuously traversed until a traversed picture block in which the neighboring location is located is an affine coding block.

For example, as shown in FIG. 4, the neighboring locations of the current picture block may be traversed in a sequence of A1, B1, B0, A0, and B2, and affine coding blocks in which the neighboring locations are located are obtained.

403: Determine whether the motion information candidate list is empty.

If it is determined in step 403 that the motion information candidate list is empty, the candidate motion information of the control point of the current picture block may be directly derived based on motion information of a control point of the affine coding block in which the neighboring location is located, and the derived candidate motion information of the control point is added to the motion information candidate list. In other words, step 405 is directly performed.

If it is determined in step 403 that the motion information candidate list is not empty, to avoid adding repeated motion information to the motion information candidate list, further determining needs to be performed. In other words, step 404 is performed.

404: Determine whether the affine coding block in which the current neighboring location is located is different from an affine coding block corresponding to each piece of motion information in the motion information candidate list.

It should be understood that each piece of motion information in the motion information candidate list corresponds to one affine coding block, and each piece of motion information is derived from the corresponding affine coding block.

When the affine coding block in which the current neighboring location is located is different from the affine coding block corresponding to each piece of motion information in the motion information candidate list, there is a high probability that the candidate motion information of the current picture block that is derived based on the motion information of the control point of the affine coding block in which the current neighboring location is located is different from the motion information in the motion information candidate list. In this case, the candidate motion information of the current picture block may be determined based on the motion information of the control point of the affine coding block in which the current neighboring location is located, and the candidate motion information is added to the motion information candidate list. In other words, step 405 is performed.

In step 404, when the affine coding block in which the current neighboring location is located is the same as affine coding blocks corresponding to some motion information in the motion information candidate list, the candidate motion information of the control point of the current picture block derived based on the motion information of the control point of the affine coding block in which the current neighboring location is located is the same as the existing candidate motion information in the motion information candidate list. In this case, the neighboring locations of the current picture block need to be traversed again, and the affine coding block in which the current neighboring location is located continues to be searched for. In other words, step 402 is performed.

It should be understood that, in step 404, specifically, whether the coding block in which the current neighboring location is located is the same as the affine coding block corresponding to each piece of motion information in the motion information candidate list may be determined by comparing whether coordinates of a specific location of the coding block in which the current neighboring location is located are the same as coordinates of a specific location of the affine coding block corresponding to each piece of motion information in the motion information candidate list.

Specifically, pixel coordinates (x, y) of the top-left corner of the affine coding block in which the current neighboring location is located may be compared with pixel coordinates (xn, yn) of the top-left corner of the affine coding block corresponding to the existing motion information in the motion information candidate list. n is greater than or equal to 0 and less than N−1, and N is a quantity of pieces of motion information included in the motion information candidate list (the length of the constructed motion information candidate list).

For example, as shown in FIG. 3, it is assumed that the current neighboring location is B1, an affine coding block to which B1 belongs is the CU 2, and coordinates of the top-left corner of the CU 2 are (x2, y2). In this case, if the motion information candidate list is empty, the motion information of the control point of the current picture block may be directly derived based on motion information of a control point of the CU 2, and the derived motion information of the control point is added to the motion information candidate list. In this case, if the motion information candidate list is not empty, only one piece of motion information exists in the motion information candidate list, a picture block corresponding to the motion information is the CU 1, and coordinates of the top-left corner of the CU 1 are (x1, y1), whether x1 is equal to x2 and whether y1 is equal to y2 may be determined to determine whether the CU 2 is the same as the CU 1. As shown in FIG. 4, a vertical coordinate of the top-left corner of the CU 2 is the same as a vertical coordinate of the top-left corner of the CU 1, and a horizontal coordinate of the top-left corner of the CU 2 is different from a horizontal coordinate of the top-left corner of the CU 1. Therefore, the CU 2 is different from the CU 1. Next, the candidate motion information of the control point of the current picture block may be derived based on the motion information of the control point of the CU 2, and the candidate motion information of the control point is added to the motion information candidate list.

Further, in step 404, only an affine coding block in which a neighboring location is located and that is on a same side of the current picture block may be compared with. The affine coding block in which the current neighboring location is located is not compared with the affine coding block corresponding to each piece of motion information in the motion information candidate list. This further reduces complexity of constructing the motion information candidate list.

In addition, to determine whether the affine coding block in which the current neighboring location is located is the same as the affine coding block corresponding to each piece of motion information in the motion information candidate list, a unique count value or a unique ID value may further be allocated to each affine coding block. Whether the affine coding blocks are the same is determined by comparing count values or ID values of the affine coding blocks.

405: Derive the candidate motion information of the control point of the current picture block based on the motion information of the control point of the affine coding block in which the current neighboring location is located, and add the candidate motion information of the control point to the motion information candidate list.

It should be understood that step 401 to step 405 show only a part of a process of constructing the motion information candidate list. Actually, in the process of constructing the motion information candidate list, it may further be determined whether a quantity of pieces of motion information that have been added to the motion information candidate list reaches a preset quantity (for example, a maximum list length, which may be specifically 1, 2, 3, 4, or 5). If the quantity of pieces of motion information reaches the preset quantity, construction of the motion information candidate list is completed. If the quantity of pieces of motion information does not reach the preset quantity, the neighboring locations of the current picture block continue to be traversed, to obtain the motion information.

In this application, to obtain the motion information in the motion information candidate list, a coding block candidate list may alternatively be constructed first, and different affine coding blocks are added to the coding block candidate list. In this way, after the coding block candidate list is completed, the candidate motion information of the control point of the current picture block may be directly derived based on motion information of a control point of an affine coding block in the coding block candidate list, and the candidate motion information of the control point is added to the motion information candidate list. With reference to Example 2, the following describes in detail a manner of first constructing a coding block candidate list and then obtaining the motion information candidate list based on the coding block candidate list.

Example 2: Manner 2 of Constructing the Motion Information Candidate List in the Affine Mode Different from Example 1, in Example 2, the coding block candidate list is first constructed, and then the motion information candidate list is obtained based on the coding block candidate list.

It should be understood that, in Example 1, each time an affine coding block in which a neighboring location is located is determined, the candidate motion information of the control point of the current picture block is derived based on motion information of a control point of the affine coding block. However, in Example 2, all affine coding blocks are first determined, and then the candidate motion information of the control point of the current picture block is derived based on all the affine coding blocks after all the affine coding blocks are determined. In Example 2, the candidate motion information in the motion information candidate list is constructed once. Compared with a manner of constructing the candidate motion information for a plurality of times in Example 1, this manner of constructing the candidate motion information is simpler. The following describes a process of Example 2. It should be understood that, in addition to the difference in the foregoing analysis, another part of the process of Example 2 is basically similar to that of Example 1. To avoid unnecessary repetition, Example 2 is only briefly described below.

Figure 9:
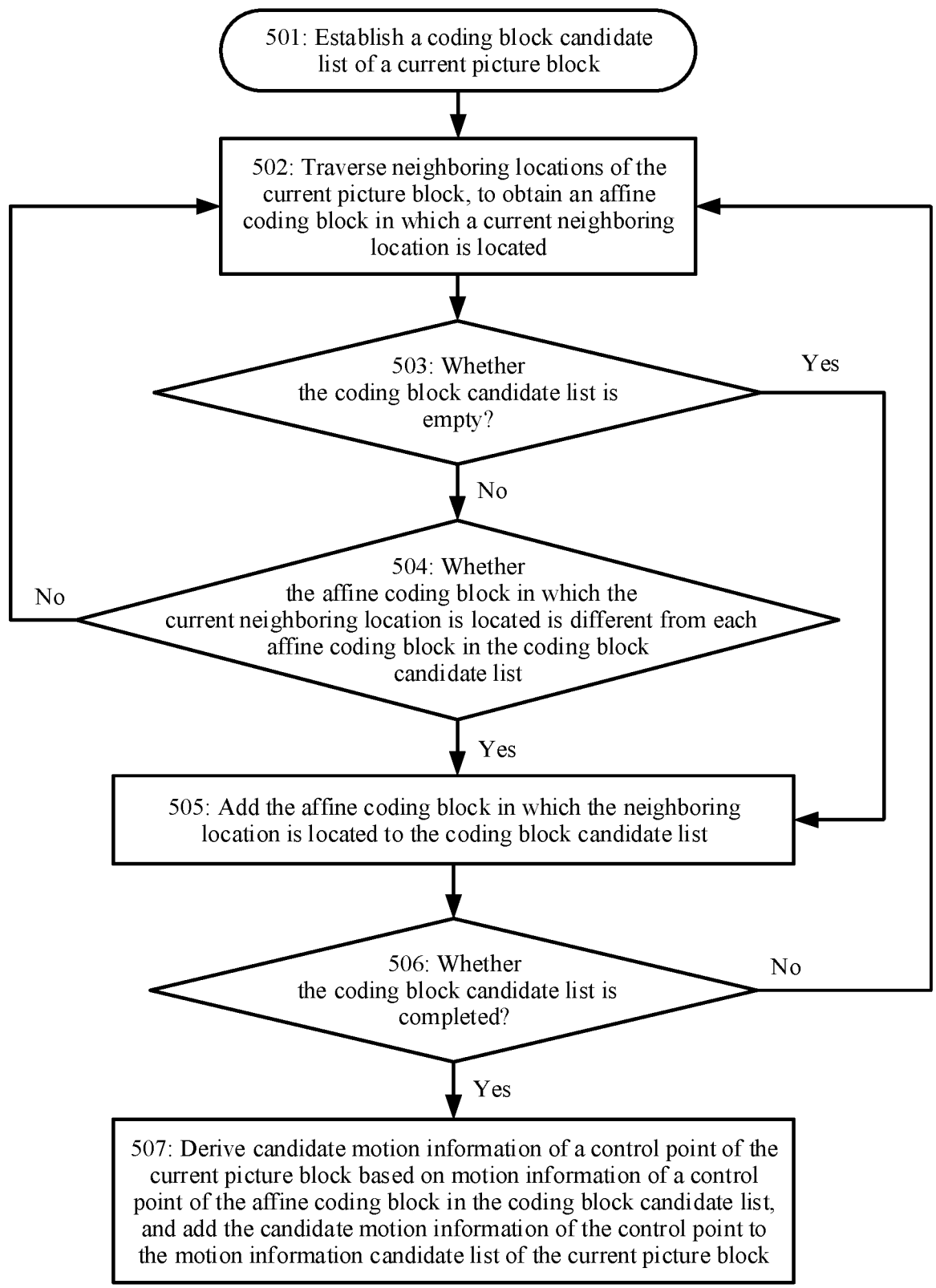
FIG. 9 is a flowchart of an inter prediction method according to an embodiment of this application.

A specific process of Example 2 is shown in FIG. 9. The process shown in FIG. 9 includes step 501 to step 507, and the following describes these steps.

501: Establish a coding block candidate list of the current picture block.

An objective of establishing the coding block candidate list in step 501 is to obtain a plurality of affine coding blocks in which a plurality of neighboring locations of the current picture block are located, and add the plurality of affine coding blocks to the coding block candidate list. No same affine coding block exists in the coding block candidate list.

502: Traverse the neighboring locations of the current picture block, to obtain the affine coding block in which the current neighboring location is located.

A specific process in step 502 and explanation of step 502 are the same as the process in step 402 and the explanation of step 402 in Example 1, and details are not described herein again.

503: Determine whether the coding block candidate list is empty.

In step 503, if the coding block candidate list is empty, the affine coding block in which the current neighboring location is located may be directly added to the coding block candidate list. In other words, step 505 is performed.

In step 503, if the coding block candidate list is not empty, to ensure that a newly added affine coding block is not repeated with an existing coding block in the coding block candidate list, the affine coding block in which the current neighboring location is located needs to be compared with the existing coding block in the coding block candidate list, and then it is determined whether to add the affine coding block in which the current neighboring location is located to the coding block candidate list. In other words, step 504 is performed.

504: Determine whether the affine coding block in which the current neighboring location is located is different from the affine coding block in the coding block candidate list.

In step 504, if the affine coding block in which the current neighboring location is located is different from the affine coding block in the coding block candidate list, the affine coding block in which the current neighboring location is located may be added to the coding block candidate list. In other words, step 505 is performed.

In step 504, if a coding block that is the same as the affine coding block in which the current neighboring location is located exists in the coding block candidate list, the neighboring locations of the current picture block needs to be traversed again, to continuously obtain the affine coding block in which the neighboring location is located. In other words, step 502 is performed.

In addition, in step 504, whether the two coding blocks are the same may be determined based on pixel coordinates or numbers of specific locations of the coding blocks. A specific determining process is the same as that in Example 1, and details are not described herein again.

505: Add the affine coding block in which the current neighboring location is located to the coding block candidate list.

For example, as shown in FIG. 4, blocks in which peripheral neighboring locations of the current block are located may be traversed in a sequence of A1, B1, B0, A0, and B2, to find an affine coding block in which these locations are located. If the current coding block candidate list is empty, the affine coding block in which the current neighboring location is located may be directly added to the coding block candidate list. Otherwise (the coding block candidate list is not empty), each coding block in the coding block candidate list is traversed, to check whether the coding block that is the same as the affine coding block in which the current neighboring location is located exists in the coding block candidate list. If no same coding block exists, the affine coding block is added to the coding block candidate list.

506: Determine whether the coding block candidate list is completed.

Specifically, in step 506, it may be determined whether a quantity of coding blocks included in the coding block candidate list reaches a preset quantity (or a maximum list length). If the quantity of coding blocks included in the coding block candidate list does not reach the preset quantity, step 502 is continuously performed.

If the quantity of coding blocks included in the coding block candidate list reaches the preset quantity, construction of the coding block candidate list is completed. Then, step 507 may be performed.

507: Derive the candidate motion information of the control point of the current picture block based on motion information of a control point of the affine coding block in the coding block candidate list, and add the candidate motion information of the control point to the motion information candidate list of the current picture block.

The foregoing describes in detail a process of determining the motion information candidate list in the affine model with reference to Example 1 and Example 2. In the affine model, the candidate motion information of the current picture block needs to be determined based on the motion information of the control point of the affine coding block in which the neighboring location is located. However, in a translation model, candidate motion information of a current picture block may be directly determined based on motion information of a picture block in which a neighboring location is located (the motion information of the picture block in which the neighboring location is located is determined as the candidate motion information of the current picture block).

The following describes in detail a process of determining a motion information candidate list in the translational model with reference to Example 3 and Example 4.

It should be understood that a main difference between Example 3 and Example 4 and the foregoing Example 1 and Example 2 lies in that: In Example 3 and Example 4, the motion information of the coding block in which the neighboring location is located is directly added to the motion information candidate list as motion information of the current picture block. However, in Example 1 and Example 2, the motion information of the control point of the current picture block can be derived only based on the motion information of the control point of the affine coding block in which the neighboring location is located, and the motion information of the control point of the current picture block is added to the motion information candidate list as candidate motion information. Therefore, when Example 3 and Example 4 are described below, to avoid unnecessary repetition, repeated descriptions are properly omitted.

Figure 10:
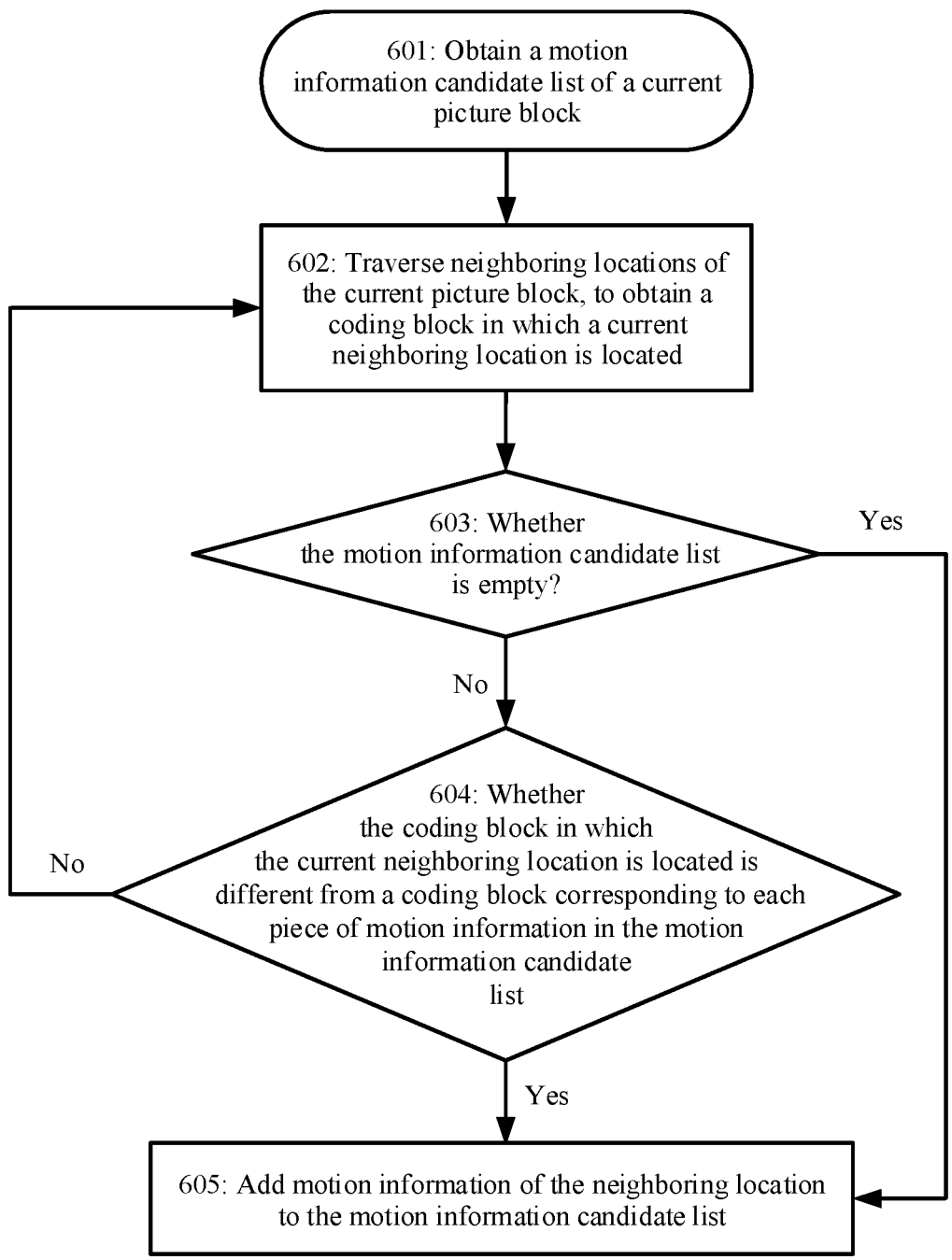
FIG. 10 is a flowchart of an inter prediction method according to an embodiment of this application.

Example 3: Manner 1 of Constructing the Motion Information Candidate List in the Translational Mode A specific process of Example 3 is shown in FIG. 10. The process shown in FIG. 10 includes step 601 to step 605, and the following describes these steps.

601: Obtain a motion information candidate list of the current picture block.

A specific process in step 601 is the same as a specific process in step 401 in Example 1, and details are not described herein again.

602: Traverse neighboring locations of the current picture block, to obtain a picture block in which a current neighboring location is located.

Different from step 402 in Example 1, a common translation block may be found herein by traversing the neighboring locations. Certainly, a traversed coding block herein may alternatively be an affine coding block. This is not limited herein.

603: Determine whether the motion information candidate list is empty.

In step 603, if it is determined that the motion information candidate list is empty, motion information of the picture block in which the current neighboring location is located may be directly added to the motion information candidate list as candidate motion information of the current picture block. In other words, step 605 is performed.

In step 603, if it is determined that the motion information candidate list is not empty, to avoid repetition of motion information, whether the coding block in which the current neighboring location is located is the same as a coding block corresponding to motion information in the motion information candidate list needs to be first compared. In other words, step 604 is performed.

Further, in the determining process in step 603, if the motion information candidate list is not empty, and the picture block in which the current neighboring location is located is not a picture block in a subblock mode, whether the coding block in which the current neighboring location is the same as the coding block corresponding to the motion information in the motion information candidate list needs to be compared. In other words, step 604 is performed.

However, if the motion information candidate list is not empty, and the picture block in which the current neighboring location is located is a picture block in the subblock mode, it is not required to compare whether the coding block in which the current neighboring location is located is the same as the coding block corresponding to the motion information in the motion information candidate list. The motion information of the picture block in which the current neighboring location is located may be directly added to the motion information candidate list. In other words, step 605 is directly performed.

604: Determine whether the coding block in which the current neighboring location is located is the same as a coding block corresponding to each piece of motion information in the motion information candidate list.

In step 604, when the coding block in which the current neighboring location is located is different from the coding block corresponding to each piece of motion information in the motion information candidate list, the motion information is not repeated. The motion information of the picture block in which the current neighboring location is located may be used as the candidate motion information of the current picture block, and the candidate motion information is added to the motion information candidate list. In other words, step 605 is performed.

In step 604, when the motion information of the coding block in which the current neighboring location is located is the same as some motion information in the motion information candidate list, the neighboring locations of the current picture block needs to be continuously traversed, to obtain the coding block in which the current neighboring location is located. In other words, step 602 is performed.

In addition, in step 604, whether the two coding blocks are the same may be determined based on pixel coordinates or numbers of specific locations of the coding blocks. A specific determining process is the same as that in Example 1, and details are not described herein again.

605: Add the motion information of the picture block in which the current neighboring location is located to the motion information candidate list.

In step 605, actually, the motion information of the picture block in which the current neighboring location is located may be first determined as the candidate motion information of the current picture block, and then the candidate motion information is added to the motion information candidate list.

Example 4: Manner 2 of Constructing the Motion Information Candidate List in the Translational Mode In Example 3, each time a coding block in which a neighboring location is located is determined, motion information of the coding block is added to the motion information candidate list. However, in Example 4, all coding blocks are first determined, and motion information of all the coding blocks is added to the motion information candidate list after all the coding blocks are determined. Compared with a manner of adding the candidate motion information to the motion information candidate list for a plurality of times in Example 1, all candidate motion information in the motion information candidate list can be determined through one operation. A manner of constructing the candidate motion information in Embodiment 4 is simpler.

Figure 11:
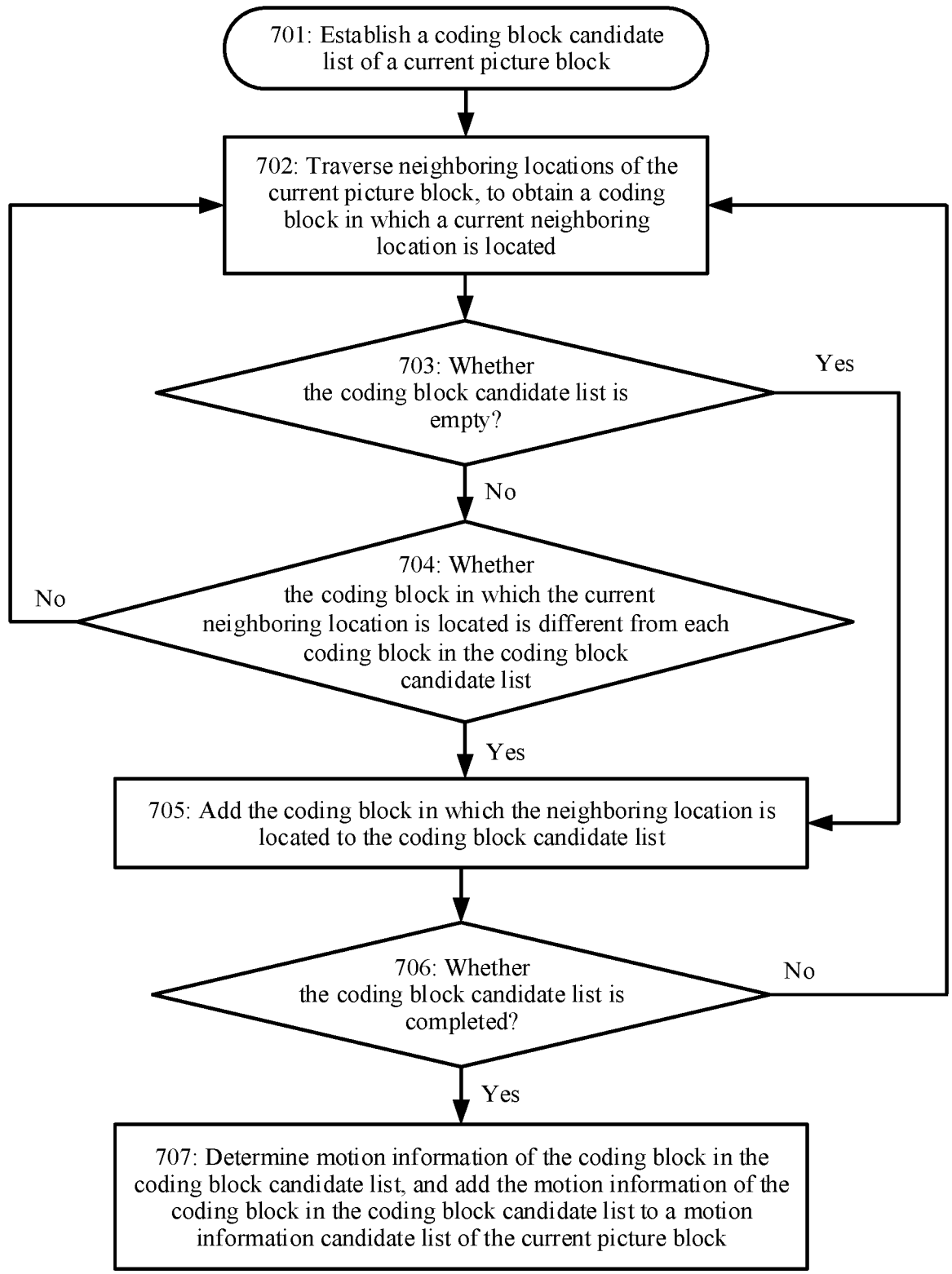
FIG. 11 is a flowchart of an inter prediction method according to an embodiment of this application.

A specific process of Example 4 is shown in FIG. 11. The process shown in FIG. 11 includes step 701 to step 707, and the following describes these steps.

701: Establish a coding block candidate list of the current picture block.

A specific process in step 701 is the same as a specific process in step 501 in Example 2, and details are not described herein again.

702: Traverse the neighboring locations of the current picture block, to obtain the coding block in which the current neighboring location is located.

Different from step 502 in Example 2, a common translation block may be found herein by traversing the neighboring locations. Certainly, a traversed coding block herein may alternatively be an affine coding block. This is not limited herein.

703: Determine whether the coding block candidate list is empty.

In step 703, if the coding block candidate list is empty, the coding block in which the current neighboring location is located may be directly added to the coding block candidate list. In other words, step 705 is performed.

In step 703, if the coding block candidate list is not empty, to ensure that a newly added coding block is not repeated with an existing coding block in the coding block candidate list, the coding block in which the current neighboring location is located needs to be compared with the existing coding block in the coding block candidate list. In other words, step 704 is performed.

Further, in the determining process in step 703, if the coding block candidate list is not empty, and the picture block in which the current neighboring location is located is not a picture block in a subblock mode, whether the coding block in which the current neighboring location is located is the same as the coding block in the coding block candidate list needs to be compared. In other words, step 704 is performed.

However, if the motion information candidate list is not empty, and the picture block in which the current neighboring location is located is a picture block in the subblock mode, it is unnecessary to compare whether the coding block in which the current neighboring location is located is the same as the coding block in the coding block candidate list. The coding block in which the current neighboring location is located may be directly added to the coding block candidate list. In other words, step 705 is directly performed.

704: Determine whether the coding block in which the current neighboring location is located is different from the coding block in the coding block candidate list.

In step 704, if the coding block in which the current neighboring location is located is different from the coding block in the coding block candidate list, the coding block in which the current neighboring location is located may be added to the coding block candidate list. In other words, step 705 is performed.

In step 704, if a coding block that is the same as the coding block in which the current neighboring location is located exists in the coding block candidate list, the neighboring locations of the current picture block needs to be traversed again, to obtain the coding block in which the neighboring location is located. In other words, step 702 is performed.

In addition, in step 704, whether the two coding blocks are the same may be determined based on pixel coordinates or numbers of specific locations of the coding blocks. A specific determining process is the same as that in Example 1, and details are not described herein again.

705: Add the coding block in which the current neighboring location is located to the coding block candidate list.

706: Determine whether construction of the coding block candidate list is completed.

Specifically, in step 706, it may be determined whether a quantity of coding blocks included in the coding block candidate list reaches a preset quantity. If the quantity of coding blocks included in the coding block candidate list does not reach the preset quantity, step 702 is continuously performed.

If the quantity of coding blocks included in the coding block candidate list reaches the preset quantity, construction of the coding block candidate list is completed. Then, step 707 may be performed.

707: Determining motion information of the coding block in the coding block candidate list, and add the motion information of the coding block in the coding block candidate list to the motion information candidate list of the current picture block.

Optionally, in the process of adding the motion information of the coding block to the motion information candidate list of the current picture block in step 707, repeatability detection may also be performed. When to-be-added motion information is the same as motion information already added to the motion information candidate list (for example, one piece of the added motion information is the same as the to-be-added motion information), the to-be-added motion information is not added to the motion information candidate list.

To further describe the case shown in Example 3, the following describes in detail, with reference to Example 5, a process of constructing the motion information candidate list when inter prediction is performed in a merge mode in the translational model.

Example 5: Process of Constructing the Motion Information Candidate List when Inter Prediction is Performed in the Merge Mode in the Translational Model With reference to FIG. 4, the following describes in detail the process of constructing the motion information candidate list in Example 5.

As shown in FIG. 4, the motion information candidate list in the merge mode in the translation model is established in a sequence of A1, B1, B0, A0, B2 and T (where T is replaced by C when T is unavailable). A1, B1, B0, A0, B2 are spatially neighboring blocks of the current picture block (the neighboring block herein refers to a block in which the neighboring location is located, and does not indicate a picture block or a coding block in a coding process), and T and C are temporally neighboring blocks of the current picture block.

As shown in FIG. 4, blocks in which peripheral neighboring locations of the current block are located may be traversed in a sequence of A1, B1, B0, A0, B2, T, and C. In this case, if the candidate list is empty or the CU in which the current neighboring location is located is a CU coded in the subblock mode, the motion information of the picture block in which the current neighboring location is located is obtained, and the motion information of the picture block in which the current neighboring location is located is added to the motion information candidate list.

Otherwise (the candidate list is not empty and the CU in which the neighboring location is located is not a CU encoded in the subblock mode), the motion information in the motion information candidate list is sequentially traversed, and it is determined whether the CU in which the current neighboring location is located is the same as a CU from which the existing motion information in the motion information candidate list comes. If no motion information from the same CU exists in the motion information candidate list, the motion information of the picture block in which the current neighboring location is located is obtained, and the motion information of the picture block in which the current neighboring location is located is added to the motion information candidate list.

When it is determined whether the CU in which the current neighboring location is located is the same as the CU from which the existing motion information in the motion information candidate list comes, whether pixel coordinates (x, y) of the top-left corner of the CU in which the current neighboring location is located are the same as pixel coordinates (xn, yn) of the top-left corner of a CU from which the existing motion information in the motion information candidate list comes may be compared. n is an integer from 0 to N−1, and N is the length of the constructed motion information candidate list. In this case, only two comparisons (a horizontal coordinate comparison and a vertical coordinate comparison) are required.

For example, for the spatially neighboring block B1 shown in FIG. 4, a CU to which the spatially neighboring block B1 belongs is the CU 2, and the coordinates of the top-left corner of the CU 2 are (x2, y2). In this case, if the candidate list is empty, motion information of a block in which B1 is located is obtained, and the motion information of the block in which B1 is located is added to the motion information candidate list. In this case, if the motion information candidate list is not empty, for example, motion information corresponding to a block in which A1 is located may already exist in the list, where A1 is located in the CU 1, and the coordinates of the top-left corner of the CU 1 are (x1, y1), whether x2≠x1∥y2≠y1 is met needs to be determined. If x2≠x1∥y2≠y1, the motion information of the block in which B1 is located is obtained, and the motion information of the block in which B1 is located is added to the motion information candidate list. If the CU in which B2 is located is located is a CU encoded in the subblock mode (for example, an affine coding block), motion information in which B2 is located is added to the motion information candidate list.

The peripheral neighboring locations of the current picture block are traversed one by one in the foregoing process, until construction of the motion information candidate list of the current picture block is completed.

To better understand the inter prediction method in the embodiments of this application, the following describes in detail, with reference to Example 6, a process of constructing a motion information candidate list in a specific traversal sequence (A1, B1, B0, A0, and B2).

Example 6: Construct the Motion Information Candidate List in the Traversal Sequence of A1, B1, B0, A0, and B2

In Example 6, the current picture block and the neighboring picture blocks of the current picture block that are shown in FIG. 4 are used as an example to construct the motion information candidate list. A specific process of Example 6 includes step 801 to step 809, and the following describes in detail these steps.

801: Construct the motion information candidate list of the current picture block.

802: Obtain a first neighboring location A1 of the current picture block.

A1 is on the left side of the current picture block CU 0, and A1 is located in a first neighboring picture block CU 1 of the current picture block.

803: When motion information of the CU 1 is available, determine first candidate motion information of the current picture block based on the motion information of the CU 1, and add the first candidate motion information to the motion information candidate list.

It should be understood that, if the motion information of the CU 1 is not available, a second neighboring location B1 of the current picture block is obtained. In other words, step 803 is not performed, but step 804 is directly performed.

804: Obtain the second neighboring location B1 of the current picture block.

In step 804, B1 is on the above side of the current picture block, and B1 is located in a second neighboring picture block CU 2 of the current picture block.

805: When motion information of the CU 2 is available, determine second candidate motion information of the current picture block based on the motion information of the CU 2, and add the second candidate motion information to the motion information candidate list.

It should be understood that, if the motion information of the CU 2 is not available, a third neighboring location B0 of the current picture block is obtained. In other words, step 805 is not performed, but step 806 is directly performed.

806: Obtain the third neighboring location B0 of the current picture block.

B0 is on the above side of the current picture block, and B0 is located in a third neighboring picture block CU 3 of the current picture block.

807: When motion information of the CU 3 is available, determine whether the CU 3 is the same as the CU 2.

808: When the motion information of the CU 3 is available and the CU 3 is different from the CU 2, determine third candidate motion information of the current picture block based on the motion information of the CU 3, and add the third candidate motion information to the motion information candidate list.

It should be understood that, if the motion information of the CU 3 is available, but the CU 3 is the same as the CU 2, the CU 3 is discarded. In other words, step 808 is not performed, but step 809 is directly performed.

809: Obtain a fourth neighboring location A0 of the current picture block.

A0 is on the left side of the current picture block, and A0 is located in a fourth neighboring picture block CU 4 of the current picture block.

810: When motion information of the CU 4 is available, determine whether the CU 4 is the same as the CU 1.

811: When the motion information of the CU 4 is available and the CU 4 is different from the CU 1, determine fourth candidate motion information of the current picture block based on the motion information of the CU 4, and add the fourth candidate motion information to the motion information candidate list.

It should be understood that, if the motion information of the CU 4 is available, but the CU 4 is the same as the CU 1, the CU 4 is discarded. In other words, step 811 is not performed, but step 812 is directly performed.

812: Obtain a fifth neighboring location B2 of the current picture block.

B2 is on the above side of the current picture block, and B2 is located in a fifth neighboring picture block CU 5 of the current picture block.

813: When motion information of the CU 5 is available, determine whether the CU 5 is the same as the CU 1 and the CU 2.

814: When the motion information of the CU 5 is available, and the CU 5 is different from the CU 1 and the CU 2, determine fifth candidate motion information of the current picture block based on the motion information of the CU 5, and adding the fifth candidate motion information to the motion information candidate list.

It should be understood that, if the motion information of the CU 5 is available, but the CU 5 is the same as the CU 1, or the CU 5 is the same as the CU 2, the CU 5 is discarded. In other words, step 814 is not performed.

815: Perform inter prediction on the current picture block based on the motion information candidate list.

It should be understood that, before step 815, if motion information included in the motion information candidate list does not meet a preset requirement (for example, a quantity of pieces of motion information in the motion information candidate list does not reach a preset quantity), peripheral neighboring locations of the current picture block may be continuously traversed, and the candidate motion information of the current picture block is obtained based on the motion information of the picture block in which the neighboring location is located, until the motion information candidate list meets a preset requirement.

It should be understood that, in Example 6 in this application, in the process of constructing the motion information candidate list, the neighboring locations of the current picture block are sequentially traversed. In addition, in some cases, whether the motion information determined based on the picture block in which the current neighboring location is located needs to be added to the motion information candidate list is determined in a manner of comparing whether the picture blocks are the same. This can reduce comparison operations in the process of constructing the motion information candidate list, thereby improving inter prediction efficiency.

In Example 6, the neighboring locations of the current picture block are traversed in the specific sequence (A1, B1, B0, A0, and B2), and traversing the neighboring locations of the current picture block in the specific sequence can reduce a quantity of comparisons between different picture blocks. For example, because A1 and B1 are respectively on the left side and the above side of the current picture block, when the picture block CU 2 in which B1 is located is obtained, it is unnecessary to compare the CU 2 with the CU 1. Instead, the second candidate motion information determined based on the motion information of the CU 2 may be directly added to the motion information candidate list.

The foregoing describes in detail the inter prediction method in the embodiments of this application with reference to FIG. 3 to FIG. 11. It should be understood that the inter prediction method in the embodiments of this application may correspond to the inter prediction shown in FIG. 1 and FIG. 2. The inter prediction method in the embodiments of this application may be performed in the inter prediction processes shown in FIG. 1 and FIG. 2. The inter prediction method in the embodiments of this application may be specifically performed by an inter prediction module in an encoder or a decoder. In addition, the inter prediction method in the embodiments of this application may be performed in any electronic device or apparatus that may need to encode and/or decode a video picture.

Figure 12:
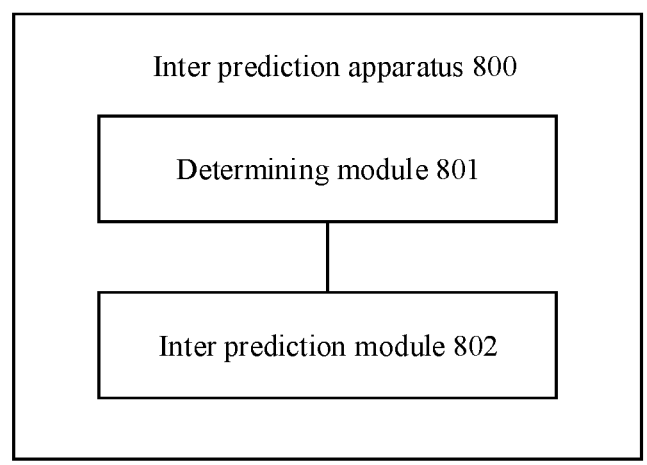
FIG. 12 is a schematic block diagram of an inter prediction apparatus according to an embodiment of this application.

The following describes in detail the inter prediction method in the embodiments of this application with reference to FIG. 12. An inter prediction apparatus 800 shown in FIG. 12 corresponds to the methods shown in FIG. 3, FIG. 5, FIG. 6, and FIG. 8 to FIG. 11. The inter prediction apparatus 800 can perform steps in the methods shown in FIG. 3, FIG. 5, FIG. 6, and FIG. 8 to FIG. 11. The foregoing limitations and explanations on related content are also applicable to the inter prediction apparatus 800 shown in FIG. 12. For brevity, repeated descriptions are properly omitted in the following description of the inter prediction apparatus 800 shown in FIG. 12.

FIG. 12 is a schematic block diagram of the inter prediction apparatus 800 according to an embodiment of this application. The inter prediction apparatus 800 shown in FIG. 12 includes:

a determining module 801, configured to determine N target picture blocks from M picture blocks in which M neighboring locations of a current picture block are located, where any two of the N target picture blocks are different, both M and N are positive integers, M is greater than or equal to N, and the determining module 801 is further configured to determine candidate motion information of the current picture block based on motion information of the N target picture blocks, and add the candidate motion information of the current picture block to a motion information candidate list of the current picture block; and an inter prediction module 802, configured to perform inter prediction on the current picture block based on the motion information candidate list.

In this application, at least one different target picture block is determined from a plurality of picture blocks in which the neighboring locations of the current picture block are located, so that the candidate motion information of the current picture block can be determined based on the at least one target picture block. In addition, the obtained candidate motion information is added to the motion information candidate list of the current picture block without comparing whether the candidate motion information is the same. This can reduce comparison operations performed when the motion information candidate list is obtained during inter prediction, thereby improving inter prediction efficiency.

Optionally, in an embodiment, the determining module 801 is configured to: determine a picture block in which a current neighboring location of the current picture block is located; and when the picture block in which the current neighboring location is located is different from each of obtained target picture blocks, determine the picture block in which the current neighboring location is located as a target picture block of the current picture block.

Optionally, in an embodiment, the picture block in the current neighboring location is located is on a first side of the current picture block. The determining module 801 is further configured to: when at least one first target picture block on the first side of the current picture block exists in the obtained target picture blocks, determine whether the picture block in which the current neighboring location is located is the same as each of the at least one first target picture block; and when the picture block in which the current neighboring location is located is different from each of the at least one first target picture block, determine that the picture block in which the current neighboring location is located is different from each of the obtained target picture blocks.

Optionally, in an embodiment, the determining module 801 is configured to: determine whether pixel coordinates of a preset location of the picture block in which the current neighboring location is located are the same as pixel coordinates of a preset location of each of the at least one first target picture block; and when the pixel coordinates of the preset location of the picture block in which the current neighboring location is located are different from the pixel coordinates of the preset location of each of the at least one first target picture block, determine that the picture block in which the current neighboring location is located is different from each of the at least one first target picture block.

Optionally, in an embodiment, the determining module 801 is configured to: determine whether a number of the picture block in which the current neighboring location is located is the same as a number of each of the at least one first target picture block; and when the number of the picture block in which the current neighboring location is located is different from the number of each of the at least one first target picture block, determine that the picture block in which the current neighboring location is located is different from each of the at least one first target picture block.

Optionally, in an embodiment, the picture block in which the current neighboring location is located is on the first side of the current picture block. The determining module 801 is further configured to: when no first target picture block on the first side of the current picture block exists in the obtained target picture blocks, determine that the picture block in which the current neighboring location is located is different from each of the obtained target picture blocks.

Optionally, in an embodiment, the determining module 801 is further configured to determine whether the picture block in which the current neighboring location is located is the same as each of the obtained target picture blocks.

Optionally, in an embodiment, the N target picture blocks are affine picture blocks, and the candidate motion information of the current picture block is candidate motion information of a control point of the current picture block. The determining module 801 is configured to determine the candidate motion information of the control point of the current picture block based on motion information of control points of the N target picture blocks.

The inter prediction method in the embodiments of this application may alternatively be performed by a video encoder or a video decoder. The following describes in detail structures of the video encoder and the video decoder in the embodiments of this application with reference to FIG. 13 and FIG. 14.

Figure 13:
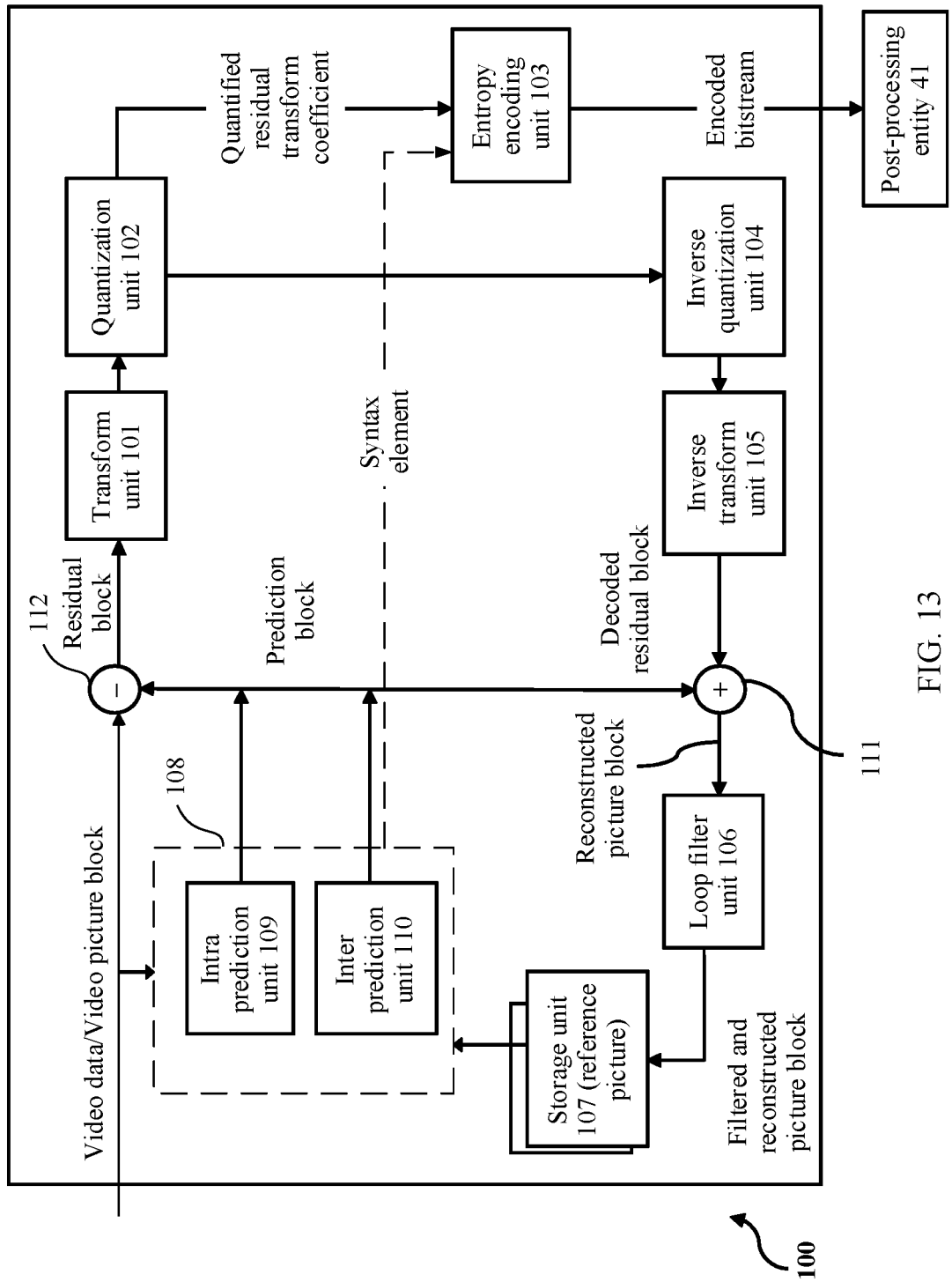
FIG. 13 is a schematic block diagram of a video encoder according to an embodiment of this application.

FIG. 13 is a block diagram of an example video encoder 100 according to an embodiment of this application. The video encoder 100 is configured to output a video to a post-processing entity 41. The post-processing entity 41 represents an example of a video entity capable of processing encoded video data that is from the video encoder 100. For example, the video entity is a media aware network element or a stitching apparatus/an editing apparatus. In some cases, the post-processing entity 41 may be an example of a network entity. In some video coding systems, the post-processing entity 41 and the video encoder 100 may be components of separate apparatuses. However, in another case, functions described with respect to the post-processing entity 41 may be implemented by a same apparatus including the video encoder 100. In an example, the post-processing entity 41 is an example of the storage apparatus 40 in FIG. 1.

The video encoder 100 may encode a video picture block, for example, perform inter prediction on the video picture block, based on any new inter prediction mode in a candidate inter prediction mode set that includes modes 0, 1, 2, . . . , and 10 and that is proposed in this application.

In an example in FIG. 13, the video encoder 100 includes a prediction processing unit 108, a filter unit 106, a decoded picture buffer (DPB) 107, a summation unit 112, a transform unit 101, a quantization unit 102, and an entropy encoding unit 103. The prediction processing unit 108 includes an inter prediction unit 110 and an intra prediction unit 109. For picture block reconstruction, the video encoder 100 further includes an inverse quantization unit 104, an inverse transform unit 105, and a summation unit 111. The filter unit 106 is intended to represent one or more loop filter units, for example, a deblocking filter unit, an adaptive loop filter (ALF) unit, and a sample adaptive offset (SAO) filter unit. Although the filter unit 106 is shown as an in-loop filter in FIG. 13, in another implementation, the filter unit 106 may be implemented as a post-loop filter. In an example, the video encoder 100 may further include a video data storage unit and a partitioning unit (not shown in the figure).

The video data storage unit may store video data encoded by a component of the video encoder 100. The video data stored in the video data storage unit may be obtained from a video source 120. The DPB 107 may be a reference picture storage unit that stores reference video data used by the video encoder 100 to encode the video data in an intra or inter coding mode. The video data storage unit and the DPB 107 each may be constituted by any one of a plurality of storage unit apparatuses, for example, a dynamic random access storage unit (DRAM) including a dynamic random access memory DRAM) or a synchronous dynamic random access memory (SDRAM), a magnetoresistive random access memory (RAM) or a magnetic random access memory (MRAM), a resistive RAM or a resistive random access memory (RRAM), or another type of storage unit apparatus. The video data storage unit and the DPB 107 may be provided by a same storage unit apparatus or separate storage unit apparatuses. In various examples, the video data storage unit may be integrated onto a chip together with other components of the video encoder 100, or may be disposed outside the chip relative to those components.

As shown in FIG. 13, the video encoder 100 receives the video data and stores the video data in the video data storage unit. The partitioning unit partitions the video data into several picture blocks, and these picture blocks may be further partitioned into smaller blocks, for example, partitioned based on a quadtree structure or a binary-tree structure. The partitioning may further include partitioning into slices, tiles, or other larger units. The video encoder 100 is usually a component for encoding a picture block in a to-be-encoded video slice. The slice may be partitioned into a plurality of picture blocks (and may be partitioned into picture block sets that are referred to as tiles). The prediction processing unit 108 may select one of a plurality of possible coding modes used for the current picture block, for example, one of a plurality of intra coding modes or one of a plurality of inter coding modes. The plurality of inter coding modes include but are not limited to one or more of the modes 0, 1, 2, 3, . . . , and 10 proposed in this application. The prediction processing unit 108 may provide obtained intra-coded and inter-coded blocks to the summation unit 112 to generate a residual block, and provide the blocks to the summation unit 111 to reconstruct an encoded block used as a reference picture.

The intra prediction unit 109 in the prediction processing unit 108 may perform intra predictive encoding on the current picture block relative to one or more neighboring blocks that are in a same frame or slice as the current to-be-encoded block, to remove spatial redundancy. The inter prediction unit 110 in the prediction processing unit 108 may perform inter predictive encoding on the current picture block relative to one or more prediction blocks in one or more reference pictures, to remove temporal redundancy.

Specifically, the inter prediction unit 110 may be configured to determine an inter prediction mode to be used to encode the current picture block. For example, the inter prediction unit 110 may calculate rate-distortion values of various inter prediction modes in a candidate inter prediction mode set through rate-distortion analysis, and select an inter prediction mode with an optimal rate-distortion feature from the inter prediction modes. Rate-distortion analysis is usually used to determine an amount of distortion (or error) between an encoded block and an original block that has not been encoded and that is to be encoded to generate the encoded block, and a bit rate (namely, a quantity of bits) used to generate the encoded block. For example, the inter prediction unit 110 may determine, in the candidate inter prediction mode set, an inter prediction mode that has a smallest rate-distortion cost and that is used to encode the current picture block, as the inter prediction mode used to perform inter prediction on the current picture block. The following describes in detail an inter predictive encoding process, particularly a process of predicting motion information of one or more subblocks (which may specifically be each subblock or all subblocks) in the current picture block in various inter prediction modes used for a non-directional or directional motion field in this application.

The inter prediction unit 110 is configured to predict the motion information (for example, a motion vector) of the one or more subblocks in the current picture block based on the determined inter prediction mode, and obtain or generate a prediction block of the current picture block by using the motion information (for example, the motion vector) of the one or more subblocks in the current picture block. The inter prediction unit 110 may locate, in one reference picture in a reference picture list, the prediction block to which the motion vector points. The inter prediction unit 110 may further generate a syntactic element associated with a picture block and a video slice, so that a video decoder 200 uses the syntactic element to decode the picture block of the video slice. Alternatively, in an example, the inter prediction unit 110 performs a motion compensation process by using the motion information of each subblock, to generate a prediction block of the subblock, thereby obtaining the prediction block of the current picture block. It should be understood that the inter prediction 110 herein performs a motion estimation process and the motion compensation process.

Specifically, after selecting the inter prediction mode for the current picture block, the inter prediction unit 110 may provide, for the entropy encoding unit 103, information indicating the selected inter prediction mode of the current picture block, so that the entropy encoding unit 103 encodes the information indicating the selected inter prediction mode. In this application, the video encoder 100 may include inter prediction data related to the current picture block in a transmitted bitstream, and the inter prediction data may include a first identifier to indicate candidate motion information that is in a motion information candidate list and that is used to predict motion information of the current picture block. For example, a location of target candidate motion information (for example, optimal candidate motion information) in the motion information candidate list is indicated.

The intra prediction unit 109 may perform intra prediction on the current picture block. Specifically, the intra prediction unit 109 may determine an intra prediction mode to be used to encode the current block. For example, the intra prediction unit 109 may calculate rate-distortion values of various to-be-tested intra prediction modes through rate-distortion analysis, and select an intra prediction mode with an optimal rate-distortion feature from the to-be-tested modes. In any case, after selecting the intra prediction mode for the picture block, the intra prediction unit 109 may provide, for the entropy encoding unit 103, information indicating the selected intra prediction mode of the current picture block, so that the entropy encoding unit 103 encodes the information indicating the selected intra prediction mode.

After the prediction processing unit 108 generates the prediction block of the current picture block through inter prediction and intra prediction, the video encoder 100 subtracts the prediction block from the current to-be-encoded picture block to form a residual picture block. The summation unit 112 represents one or more components that perform the subtraction operation. Residual video data in the residual block may be included in one or more TUs, and used by the transform unit 101. The transform unit 101 transforms the residual video data into a residual transform coefficient through transform such as discrete cosine transform (DCT) or conceptually similar transform. The transform unit 101 may transform the residual video data from a pixel value domain to a transform domain, for example, a frequency domain.

The transform unit 101 may send the obtained transform coefficient to the quantization unit 102. The quantization unit 102 quantizes the transform coefficient to further reduce a bit rate. In some examples, the quantization unit 102 may further scan a matrix including a quantized transform coefficient. Alternatively, the entropy encoding unit 103 may perform the scan.

After quantization, the entropy encoding unit 103 performs entropy encoding on the quantized transform coefficient. For example, the entropy encoding unit 103 may perform context-adaptive variable-length coding (CAVLC), context-based adaptive binary arithmetic coding (CABAC), syntax-based context-adaptive binary arithmetic coding, probability interval partitioning entropy encoding, or another entropy encoding method or technology. After the entropy encoding unit 103 performs entropy encoding, an encoded bitstream may be transmitted to the video decoder 200, or archived for subsequent transmission or to be retrieved by the video decoder 200. The entropy encoding unit 103 may further perform entropy encoding on a syntactic element of the current to-be-encoded picture block.

The inverse quantization unit 104 and the inverse transform unit 105 respectively apply inverse quantization and inverse transform, to reconstruct the residual block in a pixel domain, for example, for subsequent use as a reference block of a reference picture. The summation unit 111 adds the reconstructed residual block to the prediction block generated by the inter prediction unit 110 or the intra prediction unit 109, to generate a reconstructed picture block. The filter unit 106 may be applicable to the reconstructed picture block to reduce distortion such as blocking artifacts. Then, the reconstructed picture block is stored as the reference block in the decoded picture buffer 107, and may be used as the reference block by the inter prediction unit 110 to perform inter prediction on a block in a subsequent video frame or picture.

It should be understood that another structural variant of the video encoder 100 may be used to encode a video stream. For example, for some picture blocks or picture frames, the video encoder 100 may directly quantize a residual signal. Correspondingly, processing by the transform unit 101 and the inverse transform unit 105 is not required. Alternatively, for some picture blocks or picture frames, the video encoder 100 does not generate residual data. Correspondingly, processing by the transform unit 101, the quantization unit 102, the inverse quantization unit 104, and the inverse transform unit 105 is not required. Alternatively, the video encoder 100 may directly store the reconstructed picture block as the reference block, and processing by the filter unit 106 is not required. Alternatively, the quantization unit 102 and the inverse quantization unit 104 in the video encoder 100 may be combined. The loop filter unit is optional. In addition, for lossless compression coding, the transform unit 101, the quantization unit 102, the inverse quantization unit 104, and the inverse transform unit 105 are optional. It should be understood that, in different application scenarios, the inter prediction unit and the intra prediction unit may be selectively enabled. In this solution, the inter prediction unit is enabled.

It should be understood that the video encoder shown in FIG. 13 can perform the inter prediction method in the embodiments of this application. Specifically, the inter prediction unit 110 in the video encoder shown in FIG. 13 can perform the inter prediction method in the embodiments of this application.

In addition, the inter prediction apparatus 800 shown in FIG. 12 is equivalent to the inter prediction unit 110 in the video encoder shown in FIG. 13.

Figure 14:
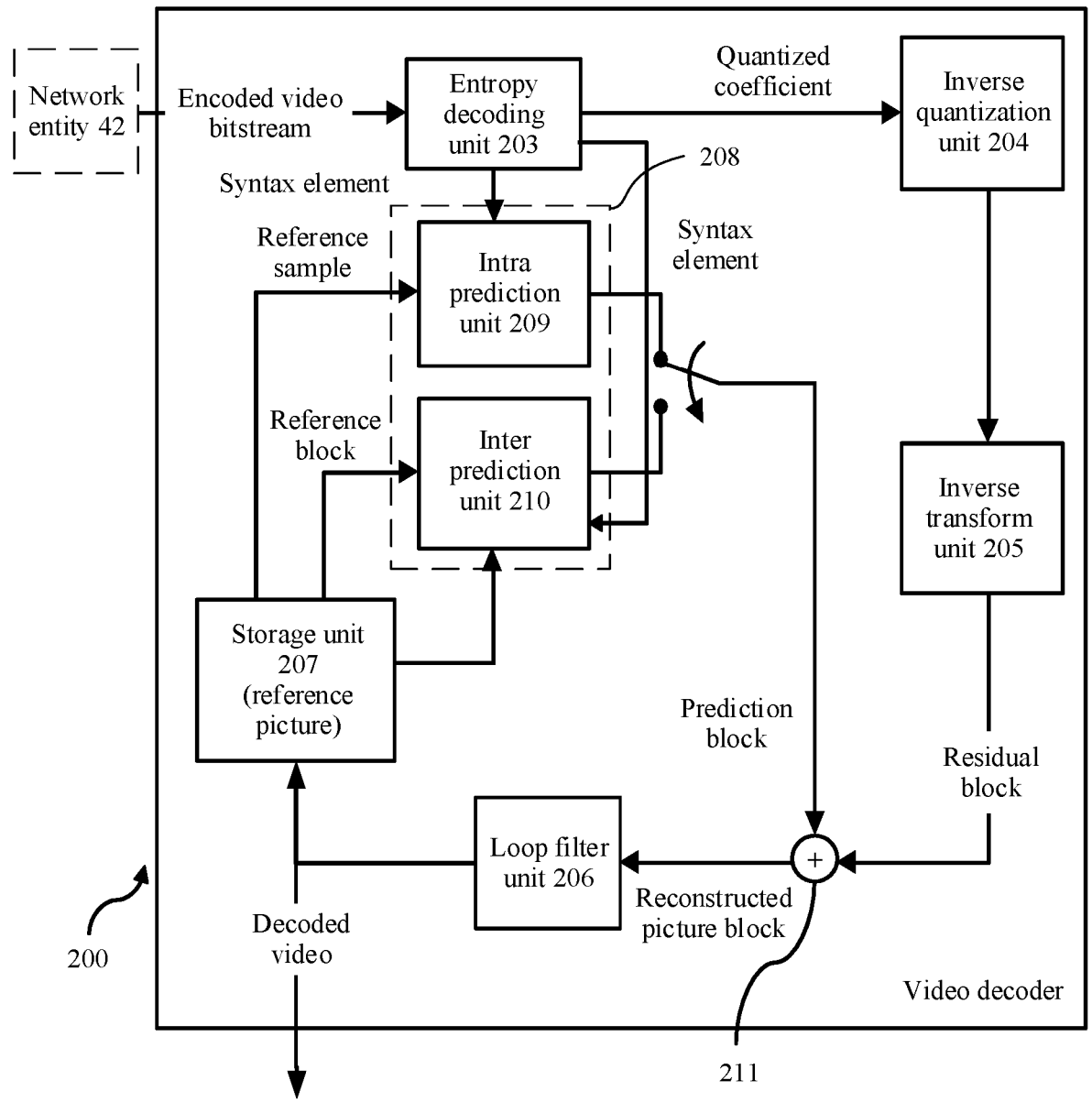
FIG. 14 is a schematic block diagram of a video decoder according to an embodiment of this application.

FIG. 14 is a block diagram of an example video decoder 200 according to an embodiment of this application. In an example in FIG. 14, the video decoder 200 includes an entropy decoding unit 203, a prediction processing unit 208, an inverse quantization unit 204, an inverse transform unit 205, a summation unit 211, a filter unit 206, and a decoded picture buffer 207. The prediction processing unit 208 may include an inter prediction unit 210 and an intra prediction unit 209. In some examples, the video decoder 200 may perform a decoding process that is substantially inverse to the encoding process described with respect to the video encoder 100 in FIG. 13.

During decoding, the video decoder 200 receives, from the video encoder 100, an encoded video bitstream that represents a picture block of an encoded video slice and an associated syntactic element. The video decoder 200 may receive video data from a network entity 42, and optionally, may further store the video data in a video data storage unit (which is not shown in the figure). The video data storage unit may store video data, such as the encoded video bitstream, that is to be decoded by a component of the video decoder 200. The video data stored in the video data storage unit may be obtained from, for example, a local video source such as a storage apparatus 40 or a camera through wired or wireless network communication of the video data, or by accessing a physical data storage medium. The video data storage unit may be used as the coded picture buffer (CPB) configured to store the encoded video data that is from the encoded video bitstream. Therefore, although the video data storage unit is not shown in FIG. 14, the video data storage unit and the DPB 207 may be a same storage unit, or may be separately disposed storage units. The video data storage unit and the DPB 207 each may be constituted by any one of a plurality of storage unit apparatuses, for example, a dynamic random access memory (DRAM) including a synchronous DRAM (SDRAM), a magnetoresistive RAM (MRAM), a resistive RAM (RRAM), or another type of storage unit apparatus. In various examples, the video data storage unit may be integrated onto a chip together with other components of the video decoder 200, or may be disposed outside the chip relative to those components.

The network entity 42 may be, for example, a server, a video editor/splicer. The network entity 42 may or may not include a video encoder, for example, the video encoder 100. Before the network entity 42 sends the encoded video bitstream to the video decoder 200, the network entity 42 may implement a part of the technology described in this application. In some video decoding systems, the network entity 42 and the video decoder 200 may be components of separate apparatuses. In another case, functions described with respect to the network entity 42 may be implemented by a same apparatus including the video decoder 200. In some cases, the network entity 42 may be an example of the storage apparatus 40 in FIG. 1.

The entropy decoding unit 203 of the video decoder 200 performs entropy decoding on the bitstream to generate a quantized coefficient and some syntactic elements. The entropy decoding unit 203 forwards the syntactic elements to the prediction processing unit 208. The video decoder 200 may receive syntactic elements/a syntactic element at a video slice level and/or a picture block level.

When the video slice is decoded into an intra-decoded (I) slice, the intra prediction unit 209 of the prediction processing unit 208 may generate a prediction block of the picture block of the current video slice based on a signaled intra prediction mode and data of a previously decoded block of a current frame or picture. When the video slice is decoded into an inter-decoded (namely, B or P) slice, the inter prediction unit 210 of the prediction processing unit 208 may determine, based on the syntactic element received from the entropy decoding unit 203, an inter prediction mode to be used to decode a current picture block of the current video slice, and decode (for example, perform inter prediction on) the current picture block based on the determined inter prediction mode. Specifically, the inter prediction unit 210 may determine whether to use a new inter prediction mode to predict the current picture block of the current video slice. If the syntax element indicates to use the new inter prediction mode to predict the current picture block, the inter prediction unit 210 predicts motion information of the current picture block of the current video slice or motion information of a subblock of the current picture block based on the new inter prediction mode (for example, a new inter prediction mode indicated by the syntax element or a default new inter prediction mode), to obtain or generate a prediction block for the current picture block or the subblock of the current picture block based on the predicted motion information of the current picture block or the predicted motion information of the subblock of the current picture block by using a motion compensation process. The motion information herein may include reference picture information and a motion vector. The reference picture information may include but is not limited to unidirectional/bidirectional prediction information, a reference picture list number, and a reference picture index corresponding to a reference picture list. For inter prediction, the prediction block may be generated from one of reference pictures in one of reference picture lists. The video decoder 200 may construct reference picture lists, namely, a list 0 and a list 1, based on reference pictures stored in the DPB 207. A reference frame index of the current picture may be included in one of or both a reference frame list 0 and a reference frame list 1. In some examples, the video encoder 100 may signal to indicate whether to decode a specific syntax element of a specific block by using the new inter prediction mode, or may signal to indicate whether to use the new inter prediction mode and indicate which new inter prediction mode is specifically used to decode a specific syntax element of a specific block. It should be understood that the inter prediction unit 210 herein performs the motion compensation process. The following describes in detail an inter prediction process of predicting, in various new inter prediction modes, the motion information of the current picture block or the motion information of the subblock of the current picture block by using motion information of a reference block.

The inverse quantization unit 204 performs inverse quantization on, in other words, dequantizes, a quantized transform coefficient provided in the bitstream and decoded by the entropy decoding unit 203. An inverse quantization process may include: determining a to-be-applied quantization degree by using a quantization parameter calculated by the video encoder 100 for each picture block in the video slice, and similarly determining a to-be-applied inverse quantization degree. The inverse transform unit 205 applies inverse transform, for example, inverse DCT, inverse integer transform, or a conceptually similar inverse transform process, to the transform coefficient, to generate a residual block in a pixel domain.

After the inter prediction unit 210 generates the prediction block used for the current picture block or the subblock of the current picture block, the video decoder 200 sums the residual block from the inverse transform unit 205 and the corresponding prediction block generated by the inter prediction unit 210, to obtain a reconstructed block, namely, a decoded picture block. The summation unit 211 represents a component that performs the summation operation. When necessary, a loop filter unit (in or after a decoding loop) may be further used to smoothen pixels, or video quality may be improved in another manner. The filter unit 206 may represent one or more loop filter units, for example, a deblocking filter unit, an adaptive loop filter (ALF) unit, and a sample adaptive offset (SAO) filter unit. Although the filter unit 206 is shown as an in-loop filter unit in FIG. 14, in another implementation, the filter unit 206 may be implemented as a post-loop filter unit. In an example, the filter unit 206 is applicable to block reconstruction to reduce block distortion, and this result is output as a decoded video stream. In addition, a decoded picture block in a given frame or picture may be further stored in the decoded picture buffer 207, and the decoded picture buffer 207 stores a reference picture used for subsequent motion compensation. The decoded picture buffer 207 may be a part of a storage unit, and may further store a decoded video for subsequent presentation on a display apparatus, or may be separated from such storage unit.

It should be understood that another structural variant of the video decoder 200 may be used to decode the encoded video bitstream. For example, the video decoder 200 may generate an output video stream without processing by the filter unit 206. Alternatively, for some picture blocks or picture frames, the entropy decoding unit 203 of the video decoder 200 does not obtain a quantized coefficient through decoding. Correspondingly, processing by the inverse quantization unit 204 and the inverse transform unit 205 is not required. The loop filter unit is optional. In addition, for lossless compression, the inverse quantization unit 204 and the inverse transform unit 205 are optional. It should be understood that, in different application scenarios, the inter prediction unit and the intra prediction unit may be selectively enabled. In this solution, the inter prediction unit is enabled.

It should be understood that the video decoder shown in FIG. 14 can perform the inter prediction method in the embodiments of this application. Specifically, the inter prediction unit 210 in the video decoder shown in FIG. 14 can perform the inter prediction method in the embodiments of this application.

In addition, the inter prediction apparatus 800 shown in FIG. 12 is equivalent to the inter prediction unit 210 in the video decoder shown in FIG. 14.

Figure 15:
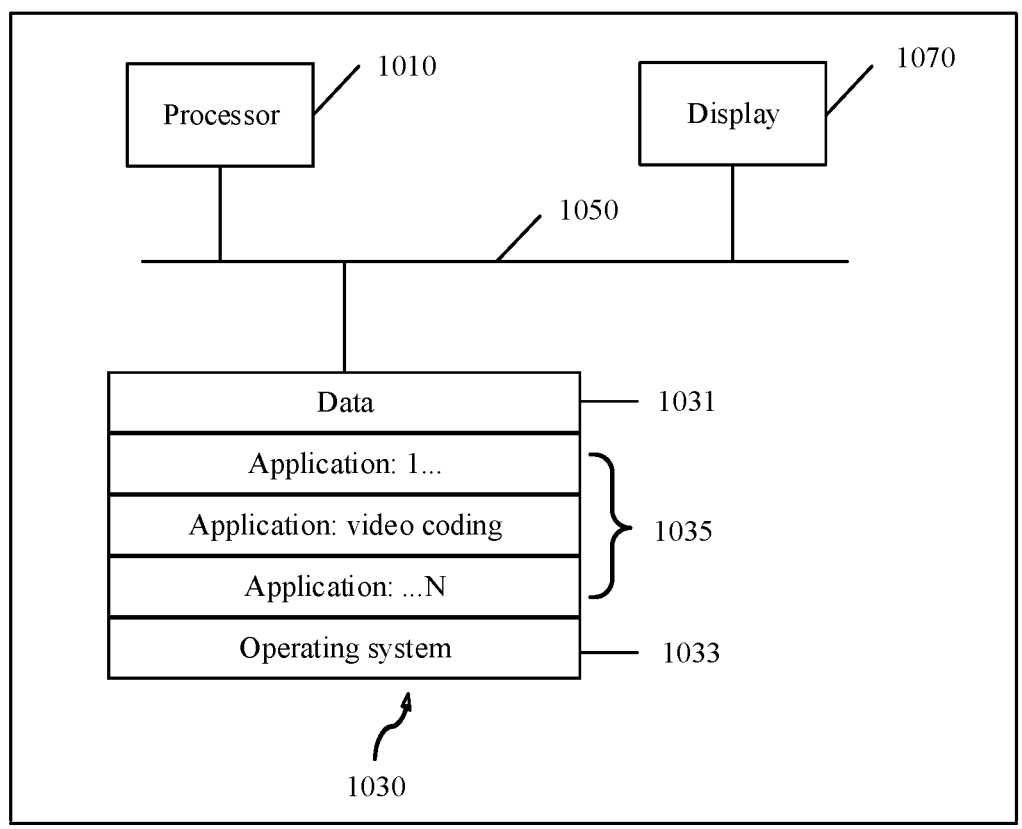
FIG. 15 is a schematic diagram of a structure of an encoding device or a decoding device according to an embodiment of this application.

FIG. 15 is a schematic block diagram of an implementation of an encoding device or a decoding device (briefly referred to as a coding device 1000) according to an embodiment of this application. The coding device 1000 may include a processor 1010, a memory 1030, and a bus system 1050. The processor and the memory are connected through the bus system. The memory is configured to store an instruction. The processor is configured to execute the instruction stored in the memory. The memory of the coding device stores program code. The processor may invoke the program code stored in the memory, to perform various video encoding or decoding methods described in this application, particularly video encoding or decoding methods in various new inter prediction modes and motion information prediction methods in the new inter prediction modes. To avoid repetition, details are not described herein again.

In this embodiment of this application, the processor 1010 may be a central processing unit (CPU). The processor 1010 may alternatively be another general purpose processor, a digital signal processor (DSP), an application specific integrated circuit (ASIC), a field programmable gate array (FPGA), or another programmable logical device, a discrete gate or a transistor logical device, a discrete hardware component, or the like. The general purpose processor may be a microprocessor, or the processor may be any conventional processor or the like.

The memory 1030 may include a read-only memory (ROM) device or a random access memory (RAM) device. Any other storage device of an appropriate type may alternatively be used as the memory 1030. The memory 1030 may include code and data 1031 accessed by the processor 1010 through the bus system 1050. The memory 1030 may further include an operating system 1033 and an application program 1035. The application program 1035 includes at least one program that allows the processor 1010 to perform the video encoding or decoding method described in this application (in particular, the encoding method or the decoding method described in this application). For example, the application program 1035 may include applications 1 to N, and further include a video encoding or decoding application (briefly referred to as a video coding application) for performing the video encoding or decoding method described in this application.

The bus system 1050 may further include a power bus, a control bus, a status signal bus, and the like, in addition to a data bus. However, for clear description, various types of buses in the figure are marked as the bus system 1050.

Optionally, the coding device 1000 may further include one or more output devices, for example, a display 1070. In an example, the display 1070 may be a touch display that integrates a display with a touch unit that can operationally sense a touch input. The display 1070 may be connected to the processor 1010 through the bus system 1050.

Figure 16:
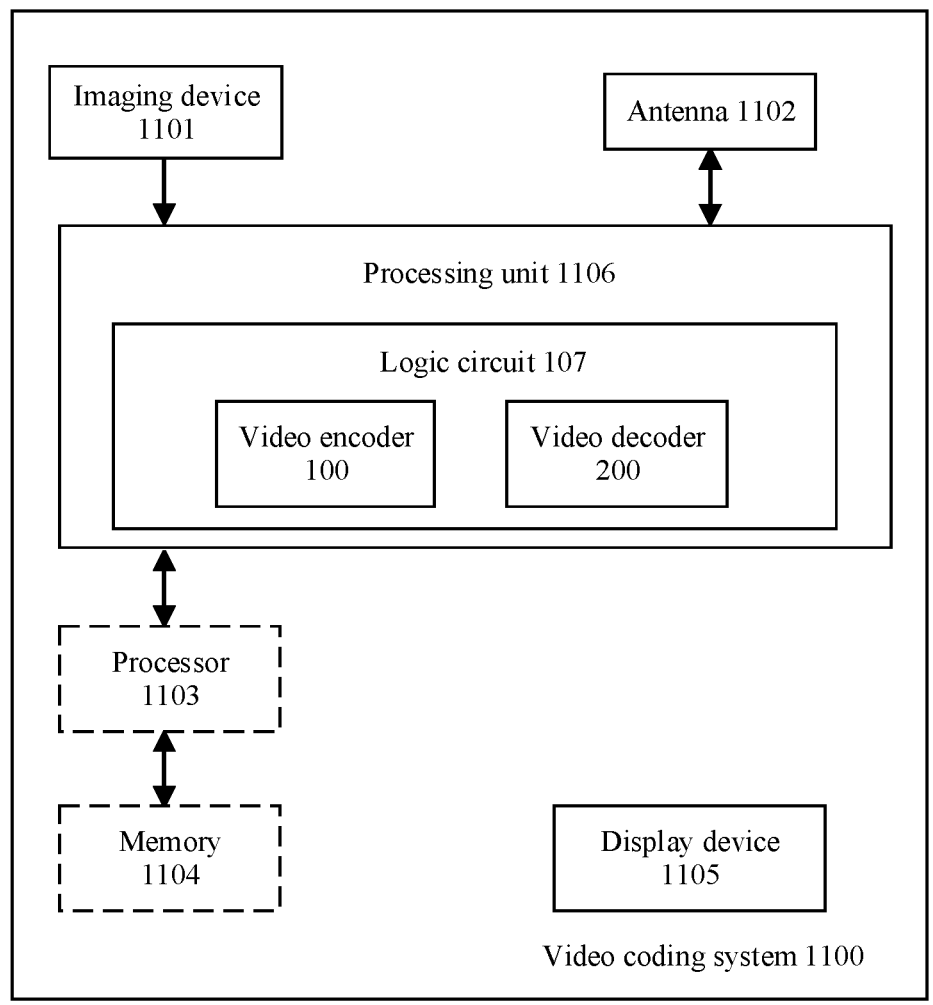
FIG. 16 is a schematic block diagram of a video coding system according to an embodiment of this application.

FIG. 16 is an illustration diagram of an example of a video coding system 1100 including the encoder 100 in FIG. 13 and/or the decoder 200 in FIG. 14 according to an example embodiment. The system 1100 may implement a combination of various technologies of this application. In a described implementation, the video coding system 1100 may include an imaging device 1101, the video encoder 100, the video decoder 200 (and/or a video encoder implemented by using a logic circuit 1107 of a processing unit 1106), an antenna 1102, one or more processors 1103, one or more memories 1104, and/or a display device 1105.

As shown in the figure, the imaging device 1101, the antenna 1102, the processing unit 1106, the logic circuit 1107, the video encoder 100, the video decoder 200, the processor 1103, the memory 1104, and/or the display device 1105 can communicate with each other. As described, although the video coding system 1100 is illustrated by using the video encoder 100 and the video decoder 200, in another different example, the video coding system 1100 may include only the video encoder 100 or only the video decoder 200.

In some examples, as shown in the figure, the video coding system 1100 may include the antenna 1102. For example, the antenna 1102 may be configured to transmit or receive encoded bitstreams of video data. In addition, in some examples, the video coding system 1100 may include the display device 1105. The display device 1105 may be configured to present the video data. In some examples, as shown in the figure, the logic circuit 1107 may be implemented by the processing unit 1106. The processing unit 1106 may include application-specific integrated circuit (ASIC) logic, a graphics processor, a general purpose processor, or the like. The video coding system 1100 may further include an optional processor 1103. The optional processor 1103 may similarly include application-specific integrated circuit (ASIC) logic, a graphics processor, a general purpose processor, or the like. In some examples, the logic circuit 1107 may be implemented by using hardware, for example, dedicated hardware for video coding. The processor 1103 may be implemented by using general-purpose software, an operating system, or the like. In addition, the memory 1104 may be a memory of any type, for example, a volatile memory (for example, a static random access memory (SRAM) or a dynamic random access memory (DRAM)) or a nonvolatile memory (for example, a flash memory). In a non-restrictive example, the memory 1104 may be implemented as a cache memory. In some examples, the logic circuit 1107 may access the memory 1104 (for example, for implementing a picture buffer). In other examples, the logic circuit 1107 and/or the processing unit 1106 may include a memory (for example, a cache) for implementing the picture buffer.

In some examples, the video encoder 100 implemented by using the logic circuit may include a picture buffer (which is implemented by, for example, the processing unit 1106 or the memory 1104) and a graphics processing unit (which is implemented by, for example, the processing unit 1106). The graphics processing unit may be communicatively coupled to the picture buffer. The graphics processing unit may include the video encoder 100 implemented by using the logic circuit 1107, to implement various modules described with reference to FIG. 13 and/or any other encoder system or subsystem described in this specification. The logic circuit may be configured to perform various operations described in this specification.

The video decoder 200 may be implemented by the logic circuit 1107 in a similar manner, to implement various modules described with reference to the decoder 200 in FIG. 14 and/or any other decoder system or subsystem described in this specification. In some examples, the video decoder 200 implemented by using the logic circuit may include a picture buffer (which is implemented by the processing unit 1106 or the memory 1104) and a graphics processing unit (which is implemented by, for example, the processing unit 1106). The graphics processing unit may be communicatively coupled to the picture buffer. The graphics processing unit may include the video decoder 200 implemented by using the logic circuit 1107, to implement various modules described with reference to FIG. 14 and/or any other decoder system or subsystem described in this specification.

In some examples, the antenna 1102 of the video coding system 1100 may be configured to receive the encoded bitstream of the video data. As described, the encoded bitstream may include data, an indicator, an index value, mode selection data, or the like that is related to video frame encoding and that is described in this specification, for example, data related to coding partitioning (for example, a transform coefficient or a quantized transform coefficient, an optional indicator (as described), and/or data defining the coding partitioning). The video coding system 1100 may further include the video decoder 200 that is coupled to the antenna 1102 and that is configured to decode the encoded bitstream. The display device 1105 is configured to present a video frame.

In the procedures in this application, a description sequence of the steps does not strictly represent an execution sequence of the steps. The steps may or may not be performed according to the foregoing description sequence. For example, step 701 may be performed after step 702, or may be performed before step 702. Other steps are not described one by one herein.

An application scenario of the inter prediction method in the embodiments of this application is described below with reference to FIG. 17 and FIG. 18. The inter prediction method in the embodiments of this application may be performed by a video transmission system, a coding apparatus, and a coding system shown in FIG. 17 and FIG. 18.

Figure 17:
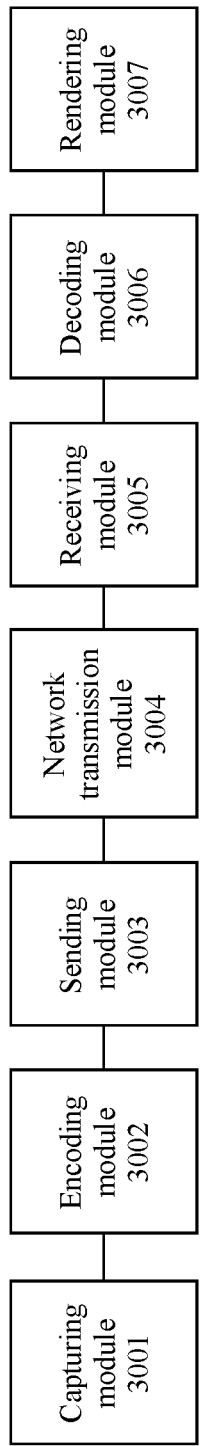
FIG. 17 is a schematic block diagram of a video transmission system according to an embodiment of this application.

FIG. 17 is a schematic block diagram of a video transmission system according to an embodiment of this application.

As shown in FIG. 17, the video transmission system includes a capturing module 3001, an encoding module 3002, a sending module 3003, a network transmission module 3004, a receiving module 3005, a decoding module 3006, and a rendering module 3007.

The modules in the video transmission system have the following specific functions:

The capturing module 3001 includes a camera or a camera group and is configured to capture a video picture and perform processing on the captured video picture before encoding, to convert an optical signal into a digitalized video sequence.

The encoding module 3002 is configured to encode the video sequence to obtain a bitstream.

The sending module 3003 is configured to send the encoded bitstream.

The receiving module 3005 is configured to receive the bitstream sent by the sending module 3003.

The network transmission module 3004 is configured to transmit, to the receiving module 3005, the bitstream sent by the sending module 3003.

The decoding module 3006 is configured to decode the bitstream received by the receiving module 3005 to reconstruct the video sequence.

The rendering module 3007 is configured to render the reconstructed video sequence obtained by the decoding module 3006 through decoding, to improve a display effect of a video.

The video transmission system shown in FIG. 17 may perform the inter prediction method in the embodiments of this application. Specifically, both the encoding module 3001 and the decoding module 3006 in the video transmission system shown in FIG. 17 may perform the inter prediction method in the embodiments of this application.

Figure 18:
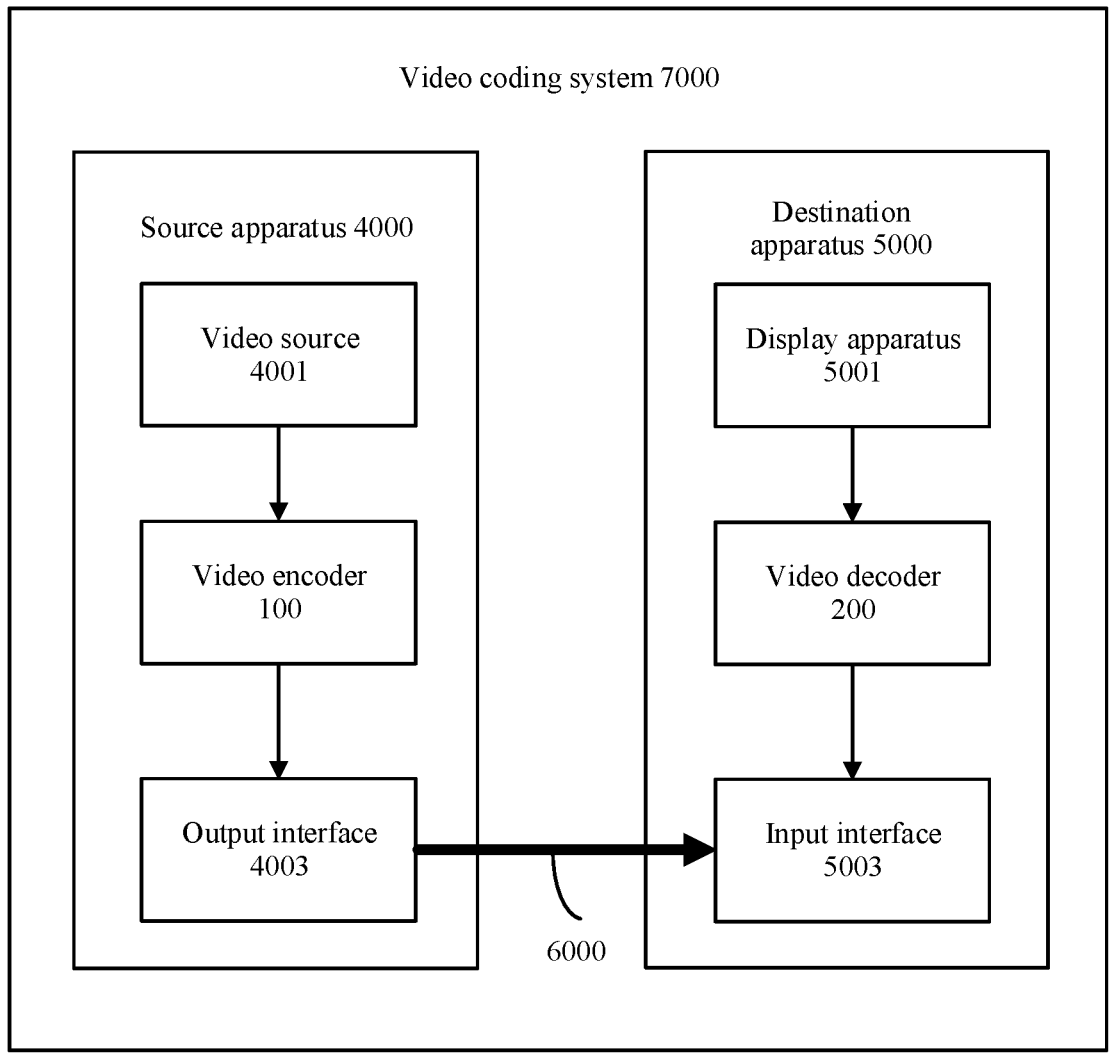
FIG. 18 is a schematic block diagram of a video coding system according to an embodiment of this application.

The following describes in detail a coding apparatus and a coding system including the coding system with reference to FIG. 18. It should be understood that the coding apparatus and the coding system shown in FIG. 18 can perform the inter prediction method in the embodiments of this application.

FIG. 18 is a schematic block diagram of a video coding system 7000 according to an embodiment of this application.

As shown in FIG. 18, the video coding system 7000 includes a source apparatus 4000 and a destination apparatus 5000. The source apparatus 4000 generates encoded video data. The source apparatus 4000 may also be referred to as a video encoding apparatus or a video encoding device. The destination apparatus 5000 may decode the encoded video data generated by the source apparatus 4000. The destination apparatus 5000 may also be referred to as a video decoding apparatus or a video decoding device.

Specific implementations of the source apparatus 4000 and the destination apparatus 5000 may be any one of the following devices: a desktop computer, a mobile computing apparatus, a notebook (for example, laptop) computer, a tablet computer, a set top box, a smartphone, a handset, a television, a camera, a display apparatus, a digital media player, a video game console, an in-vehicle computer, or another similar device.

The destination apparatus 5000 may receive the encoded video data from the source apparatus 4000 through a channel 6000. The channel 6000 may include one or more media and/or apparatuses that can move the encoded video data from the source apparatus 4000 to the destination apparatus 5000. In an example, the channel 6000 may include one or more communications media that can enable the source apparatus 4000 to directly transmit the encoded video data to the destination apparatus 5000 in real time. In this example, the source apparatus 4000 may modulate the encoded video data according to a communications standard (for example, a wireless communications protocol) and may transmit the modulated video data to the destination apparatus 5000. The one or more communications media may include wireless and/or wired communications media, for example, a radio frequency (RF) spectrum or one or more physical transmission lines. The one or more communications media may form a part of a packet-based network (for example, a local area network, a wide area network, or a global network (for example, the internet)). The one or more communications media may include a router, a switch, a base station, or another device implementing communication between the source apparatus 4000 and the destination apparatus 5000.

In another example, the channel 6000 may include a storage medium that stores the encoded video data generated by the source apparatus 4000. In this example, the destination apparatus 5000 may access the storage medium through disk access or card access. The storage medium may include a plurality of locally accessible data storage media such as a Blu-ray, a high-density digital video disc (DVD), a compact disc read-only memory (CD-ROM), or a flash memory, or another suitable digital storage medium configured to store the encoded video data.

In another example, the channel 6000 may include a file server or another intermediate storage apparatus that stores the encoded video data generated by the source apparatus 4000. In this example, the destination apparatus 5000 may access, through streaming transmission or downloading, the encoded video data stored in the file server or the another intermediate storage apparatus. The file server may be of a server type that can store the encoded video data and transmit the encoded video data to the destination apparatus 5000. For example, the file server may include a world wide web (Web) server (for example, used for a website), a file transfer protocol (FTP) server, a network attached storage (NAS) apparatus, and a local disk drive.

The destination apparatus 5000 may access the encoded video data through a standard data connection (for example, an internet connection). An example type of the data connection includes a wireless channel or a wired connection (for example, a cable modem) that can be used to access the encoded video data stored in the file server, or a combination thereof. Transmission of the encoded video data from the file server may be streaming transmission, download transmission, or a combination thereof.

The inter prediction method in this application is not limited to a wireless application scenario. For example, the inter prediction method in this application may be applied to video coding supporting a plurality of multimedia applications such as the following applications: over-the-air television broadcasting, cable television transmission, satellite television transmission, streaming-transmission video transmission (for example, through the internet), encoding of video data stored in a data storage medium, decoding of video data stored in the data storage medium, or another application. In some examples, the video encoding and decoding system 7000 may be configured to support unidirectional or bidirectional video transmission, to support applications such as video streaming transmission, video playing, video broadcasting, and/or videotelephony.

In FIG. 18, the source apparatus 4000 includes a video source 4001, a video encoder 100, and an output interface 4003. In some examples, the output interface 4003 may include a modulator/demodulator (modem) and/or a transmitter. The video source 4001 may include a video capturing apparatus (for example, a video camera), a video archive including pre-captured video data, a video input interface configured to receive video data from a video content provider, and/or a computer graphics system configured to generate video data, or a combination of the foregoing video data sources.

The video encoder 100 may encode video data from the video source 4001. In some examples, the source apparatus 4000 directly transmits encoded video data to the destination apparatus 5000 through the output interface 4003. The encoded video data may further be stored in a storage medium or a file server, so that the destination apparatus 5000 accesses the encoded video data later for decoding and/or playing.

In the example in FIG. 18, the destination apparatus 5000 includes an input interface 5003, a video decoder 200, and a display apparatus 5001. In some examples, the input interface 5003 includes a receiver and/or a modem. The input interface 5003 may receive the encoded video data through the channel 6000. The display apparatus 5001 may be integrated with the destination apparatus 5000 or may be outside the destination apparatus 5000. Usually, the display apparatus 5001 displays decoded video data. The display apparatus 5001 may include a plurality of types of display apparatuses such as a liquid crystal display, a plasma display, an organic light-emitting diode display, or another type of display apparatus.

The video encoder 100 and the video decoder 200 may operate according to a video compression standard (for example, a high efficiency video coding H.265 standard), and may comply with a high efficiency video coding (high efficiency video coding, HEVC) test model (HM). Text description ITU-TH.265 (V3) (04/2015) of the H.265 standard is released on Apr. 29, 2015, and may be downloaded from http://handle.itu.int/11.1002/7000/12455. The file is incorporated in this specification by reference in its entirety.

A person of ordinary skill in the art may be aware that units, algorithms, and steps in the examples described with reference to the embodiments disclosed in this application can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter prediction method, comprising:
    determining N target picture blocks in which M neighboring locations of a current picture block are located, wherein each of the M neighboring locations is located in one picture block, wherein any two of the N target picture blocks are different, both M and N are positive integers, and M is greater than or equal to N, and wherein the M neighboring locations of the current picture block comprise at least one of a location adjacent to a boundary of the current picture block or a location from which a distance to a boundary of the current picture block are within a specific range;
    determining candidate motion information of the current picture block based on motion information of the N target picture blocks, and adding the candidate motion information of the current picture block to a motion information candidate list of the current picture block;
    performing inter prediction on the current picture block based on the motion information candidate; and
    wherein the candidate motion information is candidate motion information of at least two control points of the current picture block; and candidate motion information of each one control point of the current picture block is derived based on all affine coding blocks in which a current neighboring location is located, after all the affine coding blocks are determined;
    wherein adding the candidate motion information to the motion information candidate list includes: firstly establishing a coding block candidate list including a plurality of affine coding blocks in which a plurality of neighboring locations of the current picture block are located, wherein no same affine coding block exists in the coding block candidate list; and deriving information from the coding block candidate list all at once and adding the information to the motion information candidate list.

2. The method according to claim 1, wherein the determining N target picture blocks from M picture blocks in which M neighboring locations of a current picture block are located comprises:
    determining a picture block in which a current neighboring location of the current picture block is located; and
    when the picture block in which the current neighboring location is located is different from each of the obtained target picture blocks, determining the picture block in which the current neighboring location is located is a target picture block of the current picture block.

3. The method according to claim 2, wherein the picture block in which the current neighboring location is located is on a first side of the current picture block, and the method further comprises:
    when at least one first target picture block on the first side of the current picture block exists in the obtained target picture blocks, determining whether the picture block in which the current neighboring location is located is the same as a corresponding first target picture block in the at least one first target picture block; and
    when the picture block in which the current neighboring location is located is different from the corresponding first target picture block in the at least one first target picture block, determining that the picture block in which the current neighboring location is located is different from each of the obtained target picture blocks, wherein
    the corresponding first target picture block refers to a picture block in which another neighboring location that is on a same side as the current neighboring location and that is closest to the current neighboring location in spatial domain is located.

4. The method according to claim 3, wherein the determining whether the picture block in which the current neighboring location is located is the same as the corresponding first target picture block in the at least one first target picture block comprises:
    determining whether pixel coordinates of a preset location of the picture block in which the current neighboring location is located are the same as pixel coordinates of a preset location of the corresponding first target picture block in the at least one first target picture block; and
    when the pixel coordinates of the preset location of the picture block in which the current neighboring location is located are different from the pixel coordinates of the preset location of the corresponding first target picture block in the at least one first target picture block, determining that the picture block in which the current neighboring location is located is different from the corresponding first target picture block in the at least one first target picture block.

5. The method according to claim 3, wherein the determining whether the picture block in which the current neighboring location is located is the same as the corresponding first target picture block in the at least one first target picture block comprises:
  determining whether a number of the picture block in which the current neighboring location is located is the same as a number of the corresponding first target picture block in the at least one first target picture block; and
  when the number of the picture block in which the current neighboring location is located is different from the number of the corresponding first target picture block in the at least one first target picture block, determining that the picture block in which the current neighboring location is located is different from the corresponding first target picture block in the at least one first target picture block.

6. The method according to claim 2, wherein the picture block in which the current neighboring location is located is on the first side of the current picture block, and the method further comprises:
  when no first target picture block on the first side of the current picture block exists in the obtained target picture blocks, determining that the picture block in which the current neighboring location is located is different from each of the obtained target picture blocks.

7. The method according to claim 1, wherein the N target picture blocks are the affine picture blocks, the candidate motion information of the current picture block is candidate motion information of a control point of the current picture block, and the determining candidate motion information of the current picture block based on motion information of the N target picture blocks comprises:
  determining the candidate motion information of the control point of the current picture block based on motion information of control points of the N target picture blocks.

8. An apparatus for coding video data, comprising:
  a non-transitory memory containing instructions; and
  a processor in communication with the memory and upon execution of the instructions, performs steps comprising:
  determining N target picture blocks in which M neighboring locations of a current picture block are located, wherein each of the M neighboring locations is located in one picture block, wherein any two of the N target picture blocks are different, both M and N are positive integers, and M is greater than or equal to N, and wherein the M neighboring locations of the current picture block comprise at least one of a location adjacent to a boundary of the current picture block or a location from which a distance to a boundary of the current picture block are within a specific range;
  determining candidate motion information of the current picture block based on motion information of the N target picture blocks, and adding the candidate motion information of the current picture block to a motion information candidate list of the current picture block;
  performing inter prediction on the current picture block based on the motion information candidate; and
  wherein the candidate motion information is candidate motion information of at least two control points of the current picture block; and candidate motion information of each one control point of the current picture block is derived based on all affine coding blocks in which a current neighboring location is located, after all the affine coding blocks are determined;
  wherein adding the candidate motion information to the motion information candidate list includes: firstly establishing a coding block candidate list including a plurality of affine coding blocks in which a plurality of neighboring locations of the current picture block are located, wherein no same affine coding block exists in the coding block candidate list; and deriving information from the coding block candidate list all at once and adding the information to the motion information candidate list.

9. The apparatus according to claim 8, wherein the steps further comprise:
  determining a picture block in which a current neighboring location of the current picture block is located; and
  when the picture block in which the current neighboring location is located is different from each of the obtained target picture blocks, determining the picture block in which the current neighboring location is located is a target picture block of the current picture block.

10. The apparatus according to claim 9, wherein the picture block in which the current neighboring location is located is on a first side of the current picture block, and wherein the steps further comprise:
  when at least one first target picture block on the first side of the current picture block exists in the obtained target picture blocks, determining whether the picture block in which the current neighboring location is located is the same as a corresponding first target picture block in the at least one first target picture block; and
  when the picture block in which the current neighboring location is located is different from the corresponding first target picture block in the at least one first target picture block, determining that the picture block in which the current neighboring location is located is different from each of the obtained target picture blocks, wherein
  the corresponding first target picture block refers to a picture block in which another neighboring location that is on a same side as the current neighboring location and that is closest to the current neighboring location in spatial domain is located.

11. The apparatus according to claim 10, wherein the steps further comprise:
  determining whether pixel coordinates of a preset location of the picture block in which the current neighboring location is located are the same as pixel coordinates of a preset location of the corresponding first target picture block in the at least one first target picture block; and
  when the pixel coordinates of the preset location of the picture block in which the current neighboring location is located are different from the pixel coordinates of the preset location of the corresponding first target picture block in the at least one first target picture block, determining that the picture block in which the current neighboring location is located is different from the corresponding first target picture block in the at least one first target picture block.

12. The apparatus according to claim 10, wherein the steps further comprise:
  determining whether a number of the picture block in which the current neighboring location is located is the same as a number of the corresponding first target picture block in the at least one first target picture block; and when the number of the picture block in which the current neighboring location is located is different from the number of the corresponding first target picture block in the at least one first target picture block, determining that the picture block in which the current neighboring location is located is different from the corresponding first target picture block in the at least one first target picture block.

13. The apparatus according to claim 9, wherein the picture block in which the current neighboring location is located is on the first side of the current picture block, and wherein the steps further comprise:

when no first target picture block on the first side of the current picture block exists in the obtained target picture blocks, determining that the picture block in which the current neighboring location is located is different from each of the obtained target picture blocks.

14. The apparatus according to claim 8, wherein the N target picture blocks are the affine picture blocks, the candidate motion information of the current picture block is candidate motion information of a control point of the current picture block, and wherein the processor is further configured for determining the candidate motion information of the control point of the current picture block based on motion information of control points of the N target picture blocks.

15. A non-transitory computer-readable storage medium, the computer-readable storage medium stores instructions; and when the instructions are executed on a computer, the computer is enabled to perform the following steps:

determining N target picture blocks in which M neighboring locations of a current picture block are located, wherein each of the M neighboring locations is located in one picture block, wherein any two of the N target picture blocks are different, both M and N are positive integers, and M is greater than or equal to N, and wherein the M neighboring locations of the current picture block comprise at least one of a location adjacent to a boundary of the current picture block or a location from which a distance to a boundary of the current picture block are within a specific range;

determining candidate motion information of the current picture block based on motion information of the N target picture blocks, and adding the candidate motion information of the current picture block to a motion information candidate list of the current picture block;

performing inter prediction on the current picture block based on the motion information candidate; and wherein the candidate motion information is candidate motion information of at least two control points of the current picture block; and candidate motion information of each one control point of the current picture block is derived based on all affine coding blocks in which a current neighboring location is located, after all the affine coding blocks are determined;

wherein adding the candidate motion information to the motion information candidate list includes: firstly establishing a coding block candidate list including a plurality of affine coding blocks in which a plurality of neighboring locations of the current picture block are located, wherein no same affine coding block exists in the coding block candidate list; and deriving information from the coding block candidate list all at once and adding the information to the motion information candidate list.

16. The non-transitory computer-readable storage medium according to claim 15, wherein the determining N target picture blocks from M picture blocks in which M neighboring locations of a current picture block are located comprises:

determining a picture block in which a current neighboring location of the current picture block is located; and when the picture block in which the current neighboring location is located is different from each of the obtained target picture blocks, determining the picture block in which the current neighboring location is located is a target picture block of the current picture block.

17. The non-transitory computer-readable storage medium according to claim 16, wherein the picture block in which the current neighboring location is located is on a first side of the current picture block, and the steps further comprise:

when at least one first target picture block on the first side of the current picture block exists in the obtained target picture blocks, determining whether the picture block in which the current neighboring location is located is the same as a corresponding first target picture block in the at least one first target picture block; and when the picture block in which the current neighboring location is located is different from the corresponding first target picture block in the at least one first target picture block, determining that the picture block in which the current neighboring location is located is different from each of the obtained target picture blocks, wherein the corresponding first target picture block refers to a picture block in which another neighboring location that is on a same side as the current neighboring location and that is closest to the current neighboring location in spatial domain is located.

18. The non-transitory computer-readable storage medium according to claim 17, wherein the determining whether the picture block in which the current neighboring location is located is the same as each of the at least one first target picture block comprises:

determining whether pixel coordinates of a preset location of the picture block in which the current neighboring location is located are the same as pixel coordinates of a preset location of the corresponding first target picture block in the at least one first target picture block; and when the pixel coordinates of the preset location of the picture block in which the current neighboring location is located are different from the pixel coordinates of the preset location of the corresponding first target picture block in the at least one first target picture block, determining that the picture block in which the current neighboring location is located is different from the corresponding first target picture block in the at least one first target picture block.

19. The computer-readable storage medium according to claim 17, wherein the determining whether the picture block in which the current neighboring location is located is the same as each of the at least one first target picture block comprises:

determining whether a number of the picture block in which the current neighboring location is located is the same as a number of the corresponding first target picture block in the at least one first target picture block; and when the number of the picture block in which the current neighboring location is located is different from the number of the corresponding first target picture block in the at least one first target picture block, determining that the picture block in which the current neighboring location is located is different from the corresponding first target picture block in the at least one first target picture block.

20. The computer-readable storage medium according to claim 15, wherein the N target picture blocks are the affine picture blocks, the candidate motion information of the current picture block is candidate motion information of a control point of the current picture block, and the determining candidate motion information of the current picture block based on motion information of the N target picture blocks comprises:

determining the candidate motion information of the control point of the current picture block based on motion information of control points of the N target picture blocks.

\* \* \* \* \*

UNITED STATES PATENT AND TRADEMARK OFFICE
CERTIFICATE OF CORRECTION

PATENT NO. : 12,015,780 B2
APPLICATION NO. : 17/187423
DATED : June 18, 2024
INVENTOR(S) : Fu et al.

It is certified that error appears in the above-identified patent and that said Letters Patent is hereby corrected as shown below:

In the Claims

Claim 1: Column 49, Line 67: reads as "based on the motion information candidate; and" should read as -- based on the motion information candidate list; and --.

Claim 8: Column 51, Line 64: reads as "based on the motion information candidate; and" should read as -- based on the motion information candidate list; and --.

Claim 15: Column 53, Line 32: reads as "the computer-readable storage medium stores instructions;" should read as -- wherein the computer-readable storage medium stores instructions; --.

Claim 15: Column 53, Line 53: reads as "based on the motion information candidate; and" should read as -- based on the motion information candidate list; and --.

Signed and Sealed this
Fifteenth Day of April, 2025

Coke Morgan Stewart
*Acting Director of the United States Patent and Trademark Office*